(12) United States Patent
Azuma et al.

(10) Patent No.: US 11,491,946 B2
(45) Date of Patent: Nov. 8, 2022

(54) SIDE AIRBAG DEVICE

(71) Applicant: ASHIMORI INDUSTRY CO., LTD., Settsu (JP)

(72) Inventors: Hidetaka Azuma, Settsu (JP); Yuta Minami, Settsu (JP); Kazuya Hashimoto, Settsu (JP)

(73) Assignee: ASHIMORI INDUSTRY CO., LTD., Settsu (JP)

( * ) Notice: Subject to any disclaimer, the term of this patent is extended or adjusted under 35 U.S.C. 154(b) by 0 days.

(21) Appl. No.: 17/302,140

(22) Filed: Apr. 26, 2021

(65) Prior Publication Data

US 2021/0339698 A1 Nov. 4, 2021

(30) Foreign Application Priority Data

May 1, 2020 (JP) .............................. JP2020-081094
May 1, 2020 (JP) .............................. JP2020-081095

(51) Int. Cl.
*B60R 21/231* (2011.01)
*B60R 21/237* (2006.01)
*B60R 21/207* (2006.01)

(52) U.S. Cl.
CPC ...... *B60R 21/23138* (2013.01); *B60R 21/207* (2013.01); *B60R 21/237* (2013.01); *B60R 2021/23146* (2013.01)

(58) Field of Classification Search
CPC ................ B60R 21/207; B60R 21/237; B60R 21/23138; B60R 2021/23146
See application file for complete search history.

(56) References Cited

U.S. PATENT DOCUMENTS

| 11,104,289 | B2* | 8/2021 | Kobayashi | ............ B60R 21/262 |
| 11,279,316 | B2* | 3/2022 | Shimono | ............. B60R 21/2171 |
| 2017/0043741 | A1 | 2/2017 | Kobayashi | |
| 2017/0158160 | A1* | 6/2017 | Sugimori | .............. B60R 21/207 |

FOREIGN PATENT DOCUMENTS

| EP | 3 190 009 A1 | 7/2017 | |
| EP | 3 395 619 A1 | 10/2018 | |
| JP | 2017-081307 A | 5/2017 | |
| JP | 2017-100634 A | 6/2017 | |
| JP | 6309105 B2 | 4/2018 | |
| WO | WO 2015/166774 A1 | 11/2015 | |
| WO | WO 2016/035746 A1 | 3/2016 | |
| WO | WO-2016045785 A1 * | 3/2016 | ........... B60R 21/237 |
| WO | WO 2019/228898 A1 | 12/2019 | |

* cited by examiner

*Primary Examiner* — Faye M Fleming
(74) *Attorney, Agent, or Firm* — Oblon, McClelland, Maier & Neustadt, L.L.P.

(57) ABSTRACT

A side airbag device is to be attached to a side portion of a seat back and includes an inflator and a bag-shaped airbag. The airbag includes a first inflation part at which a gas ejection hole of the inflator is disposed and configured to be inflated and deployed beside a body of an occupant, and a second inflation part communicating with the first inflation part and configured to be inflated and deployed beside a head of the occupant. A portion of the first inflation part is configured to be inflated and deployed above a console box and to come into contact with an upper surface of the console box. In a state where the airbag is folded, the second inflation part is folded to overlap the first inflation part such that the second inflation part is arranged inward of the first inflation part in a vehicle width direction.

8 Claims, 24 Drawing Sheets

SIDE AIRBAG DEVICE

CROSS-REFERENCE TO RELATED APPLICATIONS

This application claims priority from Japanese Patent Application No. 2020-081094 filed on May 1, 2020 and Japanese Patent Application No. 2020-081095 filed on May 1, 2020, the contents of which are incorporated herein by reference in their entireties.

TECHNICAL FIELD

The disclosure relates to a side airbag device. More particularly, the disclosure relates to a side airbag device configured to be inflated and deployed beside an occupant when a vehicle such as an automobile collides.

BACKGROUND

JP 2017-100634 A, WO 2019/228898, WO 2015/166774, and WO 2016/035746, for example, disclose a side airbag device that prevents an occupant from moving inward in the vehicle width direction and contacting another occupant seated next to the occupant at the time of a vehicle collision.

The airbag device disclosed in JP 2017-100634 A includes, in the inflated and deployed state of the airbag, a lower folded portion formed by folding a lower area that is a vehicle lower side in the airbag, an upper folded portion formed by folding an upper area that is a vehicle upper side in the airbag, and an intermediate folded portion formed by folding an intermediate area that is an intermediate between the lower area and the upper area. The intermediate folded portion is a roll-folded portion that is rolled on the side opposite to a side portion of a seat backrest inward in the vehicle width direction in the inflated and deployed state of the airbag, and wraps the upper folded portion. With these features, in the airbag device disclosed in JP 2017-100634 A, the roll-folded portion is unrolled along the arm of the occupant when the airbag passes by the side portion of the arm of the occupant during inflation and deployment process. Therefore, the course of the airbag can be made difficult to deviate to a direction away from the occupant.

In a side airbag device, an airbag is housed in a folded state and is inflated and deployed while being unfolded by gas at the time of a vehicle collision. In the side airbag device that is inflated and deployed between a vehicle member such as a console box and an occupant, it is desirable that the airbag is inflated and deployed so as not to deviate from the occupant at the time of the vehicle collision. When the airbag is pushed by the arm of the occupant during inflation and deployment, the airbag may be inflated and deployed in a direction away from the occupant, and a restraining force may be reduced.

In the case of the airbag device disclosed in JP 2017-100634 A, the airbag includes the lower folded portion, the upper folded portion, and the intermediate folded portion, and the intermediate folded portion is configured by the roll-folded portion wrapping the upper folded portion that is bellows-folded, for example. Thus, the airbag has many folds and is complicated. Therefore, in the process of manufacturing the airbag device, there is a first problem that the folding working of the airbag becomes complicated.

FIG. 9 of WO 2019/228898 discloses an airbag device including a three-dimensionally formed airbag 1 that includes a portion inflated above a central console 32. The airbag 1 is inflated and deployed when gas is introduced into a side chamber 9 from a gas inflation portion 6 and then flows into a central chamber 8 and another side chamber 9.

A side airbag device is attached to a vehicle member such as a seat back (backrest) included in a vehicle seat in a state where the airbag is folded, and various methods of folding the airbag have been studied. For example, WO 2015/166774 and WO 2016/035746 disclose an airbag device including a planar airbag formed by sewing outer edges of a pair of panels in an overlapped state, and a method of folding an upper portion or a lower portion of the airbag and then roll-folding or bellows-folding the same toward the rear of the vehicle.

In a side airbag device, an airbag is housed in a folded state and is inflated and deployed while being unfolded by gas at the time of a vehicle collision. When the three-dimensionally formed airbag as disclosed in WO 2019/228898 is folded as disclosed in WO 2015/166774 or WO 2016/035746, the side chamber 9 in which the gas inflation portion 6 is disposed is inflated in the vehicle width direction, and then, the gas flows into the central chamber 8 adjacent to the side chamber 9. Therefore, there is a second problem that deployment speed in a vehicle front and rear direction or a vehicle upper and lower direction is impaired.

SUMMARY

A first object of the disclosure has been made in view of the first problem, and is to provide a side airbag device that has a simple folding structure and that does not easily deviate to a direction away from an occupant during inflation and deployment.

A first aspect of the present disclosure is a side airbag device being to be attached to a side portion of a seat back included in a vehicle seat. The side airbag device includes: an inflator being to be attached to the side portion of the seat back and configured to generate gas, the inflator having a gas ejection hole configured to allow the gas to flow out from the inflator; and a bag-shaped airbag configured to be inflated and deployed by the gas generated from the inflator, and being configured to be inflated and deployed beside an occupant seated on the vehicle seat and above a console box provided inward relative to the vehicle seat in a vehicle width direction, the airbag including: a first inflation part at which the gas ejection hole is disposed, the first inflation part being configured to be inflated and deployed beside a body of the occupant; and a second inflation part communicating with the first inflation part, the second inflation part being configured to be inflated and deployed beside a head of the occupant by the gas introduced from the first inflation part. At least a portion of the first inflation part is configured to be inflated and deployed above the console box and to come into contact with an upper surface of the console box, and in a state where the airbag is folded, the second inflation part is folded to overlap the first inflation part such that the second inflation part is arranged inward of the first inflation part in the vehicle width direction.

According to the disclosure, it is possible to provide the side airbag device that has a simple folding structure and that does not easily deviate to the direction away from an occupant during inflation and deployment.

Further, a second object of the disclosure has been made in view of the second problem, and is to provide a side airbag device that includes an airbag including an inflated protruding part inward of a main body part in a vehicle width direction for protecting an occupant and that does not easily impair inflation and deployment speed in a vehicle front and rear direction or a vehicle upper and lower direction.

A second of the present disclosure is a side airbag device being to be attached to a side portion of a seat back included in a vehicle seat. The side airbag device includes: an inflator being to be attached to the side portion of the seat back and configured to generate gas; and a bag-shaped airbag configured to be inflated and deployed by the gas generated from the inflator, and configured to be inflated and deployed beside an occupant seated on the vehicle seat and above a console box provided inward relative to the vehicle seat in a vehicle width direction, the airbag including: a main body part configured to be inflated and deployed beside the seated occupant from the side portion of the seat back to protect the seated occupant; a gas inflow part provided in the main body part and configured to allow the gas to flow into the gas inflow part; and an inflated protruding part located inward of the gas inflow part in the vehicle width direction and configured to be inflated and deployed above the console box. An area defining a shape of the airbag in a folded state and including the gas inflow part is defined as a non-folding area, and in a state where the airbag is partially unfolded to spread out into a flat surface, a folding line along which the inflated protruding part is folded to overlap the main body part does not overlap the non-folding area.

According to the disclosure, it is possible to provide the side airbag device that includes the airbag including the inflated protruding part inward of the main body part in the vehicle width direction for protecting an occupant and that does not easily impair inflation and deployment speed in the vehicle front and rear direction or the vehicle upper and lower direction.

DETAILED DESCRIPTION

Unless otherwise specified, the description regarding the directions in this specification is based on a vehicle. For example, "front" indicates a vehicle front direction, "rear" indicates a vehicle rear direction, "upper" indicates a vehicle upper direction, "lower" indicates a vehicle lower direction, and "side" indicates an inner direction in a vehicle width direction. Further, the arrow FR appropriately shown in respective drawings indicates the vehicle front direction, the arrow RE indicates the vehicle rear direction, the arrow UP indicates the vehicle upper direction, the arrow DOWN indicates the vehicle lower direction, the arrow IN indicates the inner direction in the vehicle width direction, and the arrow OUT indicates the outer direction in in the vehicle width direction. Members arranged inside the vehicle seat are shown in a see-through state of the vehicle seat.

First Embodiment

Figure 1:
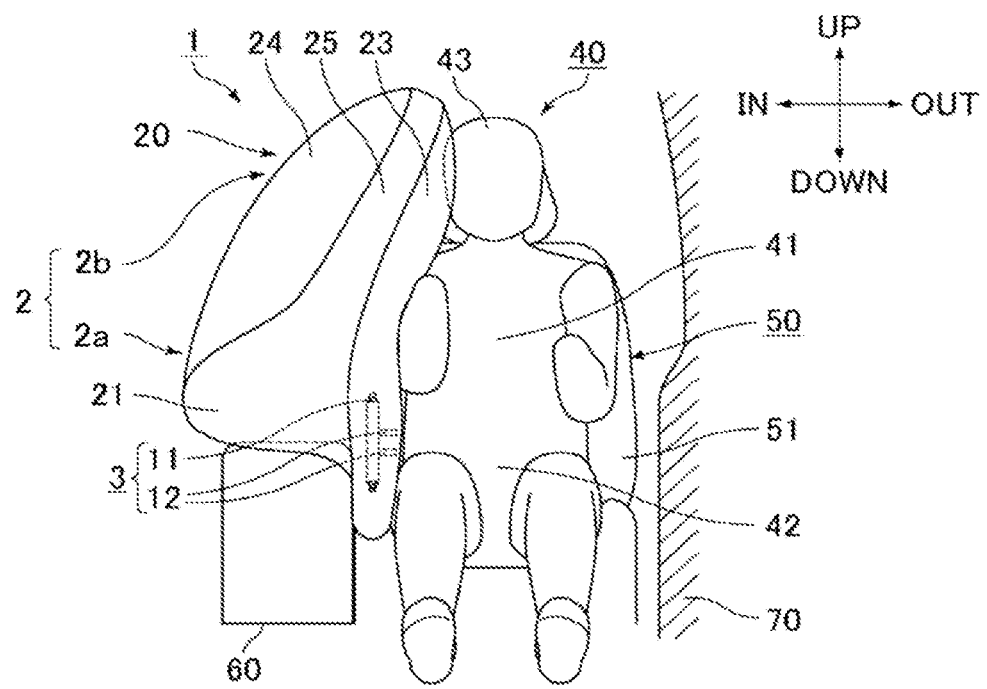
FIG. 1 is a schematic view showing a state of a side airbag device according to a first embodiment when an occupant is restrained by an airbag as viewed from the front of a vehicle.
Figure 2:
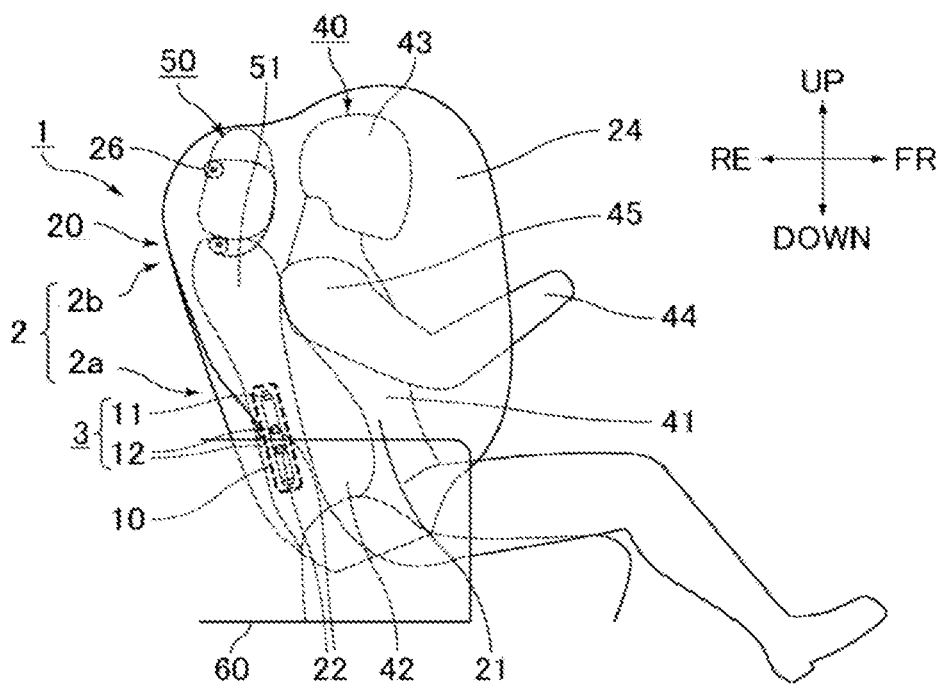
FIG. 2 is a schematic view showing the state of the side airbag device according to the first embodiment when the occupant is restrained by the airbag as viewed from the side of the vehicle.
Figure 3:
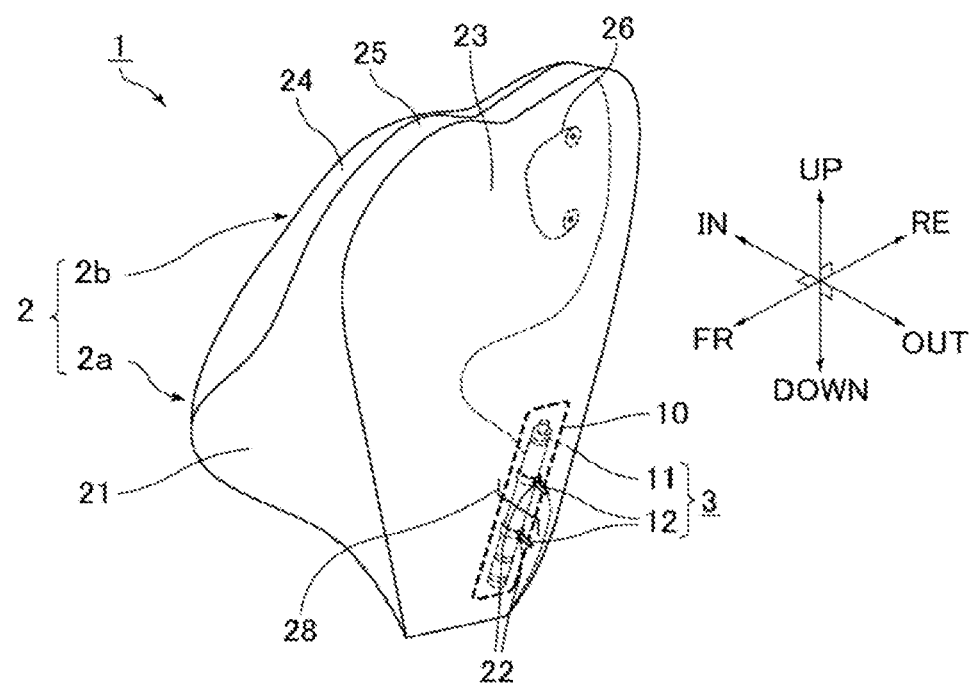
FIG. 3 is a perspective view schematically showing a three-dimensional shape of the side airbag device according to the first embodiment during inflation and deployment.

A side airbag device according to a first embodiment of the disclosure will be described below with reference to the drawings. FIG. 1 is a schematic view showing a state of the side airbag device according to the first embodiment when an occupant is restrained by an airbag as viewed from the front of a vehicle. FIG. 2 is a schematic view showing a state of the side airbag device according to the first embodiment when the occupant is restrained by the airbag as viewed from the side of the vehicle. FIG. 3 is a perspective view schematically showing a three-dimensional shape of the side airbag device according to the first embodiment during inflation and deployment.

As shown in FIGS. 1 and 2, a side airbag device 1 of the first embodiment is inflated and deployed beside an occupant 40 seated on a vehicle seat (a seat of a vehicle) 50 and above a console box 60 provided inward relative to the vehicle seat 50 in the vehicle width direction. The side airbag device 1 of the first embodiment includes an inflator 3 and an airbag 2, and is attached to a side portion of a seat back (backrest) 51 included in the vehicle seat 50 (the inner side portion in the vehicle width direction). As the vehicle seat 50, for example, a driver's seat, a passenger seat, or the like of the vehicle is assumed.

When the vehicle collides with an obstacle (e.g., another vehicle) to activate the inflator 3, gas is generated from the inflator 3. Examples of the collision include a side collision in which a vehicle collides with an obstacle from the side surface of the vehicle, an oblique collision in which a vehicle collides with an obstacle from an oblique front direction of the vehicle, and the like. Specifically, in the side collision, an obstacle collides with a vehicle side wall facing a vehicle side wall 70 shown in FIG. 1 in the vehicle width direction. When the vehicle seat 50 is a driver's seat, the vehicle side wall facing the vehicle side wall 70 corresponds to a vehicle body part located outward of a passenger seat in the vehicle width direction.

The gas generated from the inflator 3 is introduced into the airbag 2, and the airbag 2 is inflated while being unfolded. When a cover of the seat back 51 is ruptured by a force applied from the inflated airbag 2, the airbag 2 is inflated and deployed beside the occupant 40 seated on the vehicle seat 50 and above the console box 60 to protect the side portion of the occupant 40, as shown in FIGS. 1 and 2. The airbag 2 that is inflated and deployed in this way is also called a far side airbag.

In the drawings used for explaining the embodiments of the disclosure, an international unified side impact dummy (World-SID: World Side Impact Dummy) 40 is seated on the vehicle seat 50. The sitting posture of the international unified side impact dummy 40 is defined by the side collision test method (ECE R95) currently adopted in Japan and Europe, or the side collision test method (FMVSS214) currently adopted in the United States. The position and size of the airbag 2 during inflation and deployment of the airbag 2 (hereinafter, also simply referred to as "during inflation and deployment") are set according to a body 41, a waist 42, a head 43, arms 44, shoulders 42, etc. of the international unified side impact dummy 40 as shown in FIG. 1. The international unified side impact dummy 40 is referred to as the "occupant 40."

The airbag 2 is a bag-shaped airbag that is inflated and deployed by the gas generated from the inflator 3. As shown in FIGS. 1 and 3, the airbag 2 includes a main body part 20, a gas inflow part (an inflator mounting part 10), and an inflated protruding part 21. The main body part 20 is inflated and deployed beside the seated occupant 40 from the side portion of the seat back 51 to protect the seated occupant 40. The gas inflow part allows the gas generated from the inflator 3 to flow into the gas inflow part, and is provided in the main body part 20. The inflator 3 may be entirely disposed inside the airbag 2 or may be disposed outside the airbag 2. When the inflator 3 is entirely disposed inside the airbag 2, the gas inflow part corresponds to the inflator mounting part 10 that is an inner portion of the airbag 2 to which the inflator 3 is mounted, as shown in FIG. 3. When the inflator 3 is disposed outside the airbag 2, the gas inflow part corresponds to a portion where a gas ejection hole 11 of the inflator 3 communicates with the airbag 2.

Preferably, the main body part 20 communicates with the inflated protruding part 21. The airbag 2 may be a single undivided chamber, and the main body part 20 and the inflated protruding part 21 may each be a part of the single chamber. It is preferable that at least portions of the main body part 20 and the inflated protruding part 21 communicate with each other. For example, the inside of the single bag-shaped airbag may be divided into a plurality of different chambers, and the main body part 20 and the inflated protruding part 21 may each include different chambers. Further, the airbag 2 may include a plurality of bag-shaped airbags.

In the following, the case where the airbag 2 has the single undivided chamber and the main body part 20 and the inflated protruding part 21 are each a part of the single chamber will be illustrated. As shown in FIGS. 1 and 3, the gas inflow part (the inflator mounting part 10) is disposed in the main body part 20. The airbag 2 includes a first inflation part 2a that is inflated and deployed beside the body 41 of the occupant 40, and a second inflation part 2b that is inflated and deployed beside the head 43 of the occupant 40. The gas inflow part may be provided in the first inflation part 2a, which is a lower portion of the airbag 2. Since the gas inflow part is disposed in the first inflation part 2a, the airbag 2 starts to inflate and deploy from the first inflation part 2a. The airbag 2 may be a single undivided chamber, and the first inflation part 2a and the second inflation part 2b may each be a part of the single chamber. Preferably, at least a portion of the second inflation part 2b communicates with the first inflation part 2a. For example, the inside of the single bag-shaped airbag may be divided into a plurality of different chambers, and the first inflation part 2a and the second inflation part 2b may each include different chambers. The second inflation part 2b is inflated and deployed beside the head 43 of the occupant 40 by the gas introduced from the first inflation part 2a. Preferably, the second inflation part 2b receives the head 43 of the occupant 40. A flat surface portion of the second inflation part 2b may receive the head 43 of the occupant 40, or an upper end of the second inflation part 2b may receive the head 43 of the occupant 40.

As shown in FIG. 1, at least a portion of the first inflation part 2a is inflated and deployed above the console box 60 and comes into contact with an upper surface of the console box 60. The portion of the first inflation part 2a may be a protruding part that inflates toward the center in the vehicle width direction on the opposite side of the occupant 40. The inflated protruding part 21 is an example of "a portion of the first inflation part". The inflated protruding part 21 is located inward of the gas inflow part (the inflator mounting part 10) provided in the main body part 20 in the vehicle width direction and is inflated and deployed above the console box 60. The inflated protruding part 21 is also the protruding part that protrudes toward the center in the vehicle width direction on the opposite side of the occupant 40. As shown in FIG. 1, the inflated protruding part 21 is inflated and deployed above the console box 60 and comes into contact with the upper surface of the console box 60. The inflated protruding part 21 is preferably inflated and deployed along the upper surface of the console box 60 from the occupant 40 side toward the center in the vehicle width direction while being in contact with the upper surface of the console box 60. The inflated protruding part 21 is preferably inflated and deployed beyond the console box 60 toward the center in the vehicle width direction as viewed from the front of the vehicle. The inflated protruding part 21 may overlap the upper surface of the console box 60 such that the airbag 2 can be supported by the upper surface of the console box 60 during inflation and deployment. However, it is preferable that the inflated protruding part 21 covers the console box 60 in the vehicle width direction. The inflated protruding part 21 may be arranged at a position facing the inflator mounting part 10 in the vehicle width direction.

The airbag 2 includes, for example, an occupant side panel 23 arranged adjacent to the occupant 40 during inflation and deployment, a center side panel 24 arranged to face the occupant side panel 23, and a connecting panel 25 connecting an outer peripheral edge of the occupant side panel 23 and an outer peripheral edge of the center side panel 24. The center side panel 24 is arranged inward in the vehicle width direction during inflation and deployment. A chamber, which is surrounded by the occupant side panel 23, the center side panel 24, and the connecting panel 25, is formed during inflation and deployment. The connecting panel 25 may be a single strip-shaped panel, or may be formed by connecting a plurality of panels.

The width of the connecting panel 25 located on the lower of the airbag 2 during inflation and deployment is preferably wider than the width of the connecting panel 25 located on the upper of the airbag 2 during inflation and deployment. That is, the width of the connecting panel 25 defining the first inflation part 2a is preferably wider than the width of the connecting panel 25 defining the second inflation part 2b. During inflation and deployment, the width in the vehicle width direction of the inflated protruding part 21 can be made wider than the width in the vehicle width direction of the second inflation part 2b that is the upper portion of the main body part 20.

A portion of the occupant side panel 23 and a portion of the center side panel 24 may be sewn together by a sewing portion 26. The thickness of the airbag 2 in the vehicle width direction during inflation and deployment can be adjusted by the sewing portion 26. The occupant side panel 23 may have an inflator mounting hole 22 into which the inflator 3 is mounted, or a slit 28 for inserting the inflator into the airbag.

The inflator 3 is attached to the side portion of the seat back 51 and generates gas. The inflator 3 operates at the time of the vehicle collision. Specifically, first, when a collision detection sensor mounted on the vehicle detects a vehicle collision, an ECU (Electronic Control Unit) calculates a signal sent from the collision detection sensor to determine the level of the collision. When the determined collision level corresponds to the level of inflating the airbag 2, the inflator 3 is ignited, and gas is generated by a chemical reaction due to combustion. As a result, the gas generated from the inflator 3 is introduced into the airbag 2 from the gas ejection hole 11.

The inflator 3 is, for example, a cylindrical (columnar) gas generator, and is arranged along an extension direction (height direction) of the seat back 51. A pair of bolts 12 protrude from an upper portion and a lower portion of the inflator 3. The pair of bolts 12 are fixed to the side portion (e.g., a side frame 52) of the seat back 51 through the inflator mounting hole 22 provided in the airbag 2.

Although not particularly limited, the types of the inflator 3 include, for example, a pyro-type inflator that uses gas generated by combusting a gas generating agent, a stored-type inflator that uses compressed gas, and a hybrid-type inflator that uses mixed gas of gas generated by combusting a gas generating agent and compressed gas, and the like.

The console box 60 is provided inward relative to the vehicle seat 50 in the vehicle width direction. For example, the console box 60 is provided between a driver's seat and an occupant's seat at the center of a vehicle interior in the vehicle width direction. The console box 60 may function as an armrest portion that supports an arm 44 of the occupant 40 located inside in the vehicle width direction.

The vehicle side wall 70 is not particularly limited as long as it is a vehicle body portion located outward relative to the occupant 40 seated on the vehicle seat 50 in the vehicle width direction (i.e., an outer side opposite to the console box 60). Generally, the vehicle side wall 70 refers to a side door, a pillar, a side window, and the like.

Figure 4:
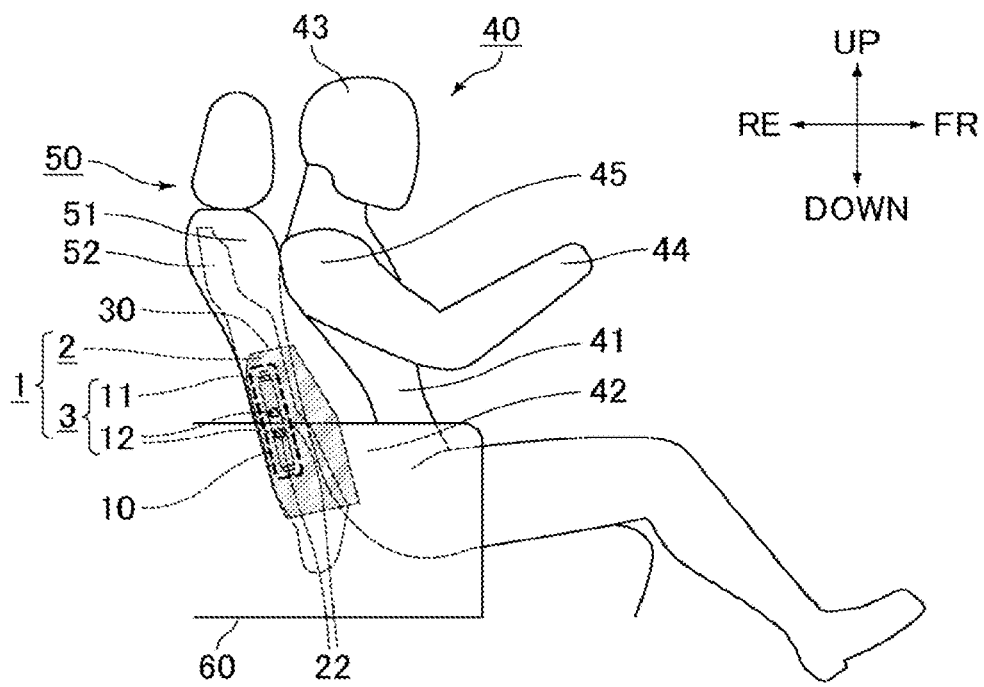
FIG. 4 is a schematic view of a state in which the side airbag device according to the first embodiment is mounted on a vehicle seat as viewed from the side of the vehicle.
Figure 5:
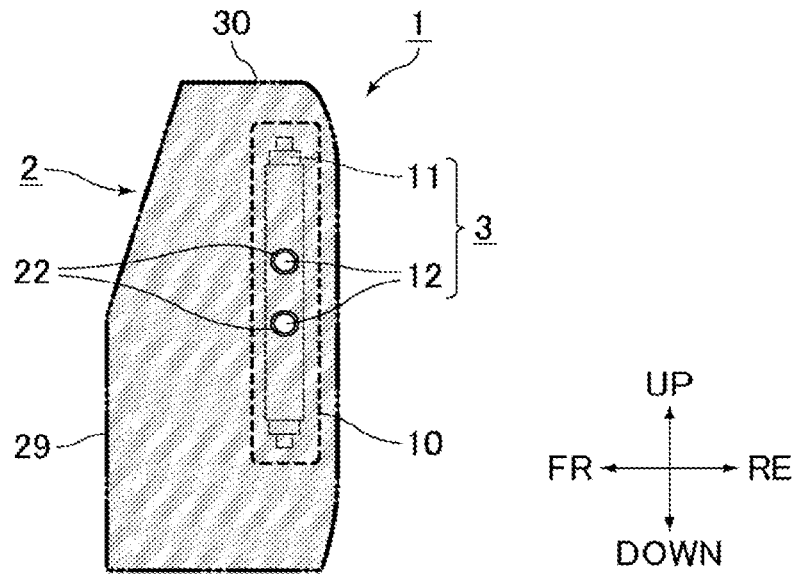
FIG. 5 is a schematic view of the side airbag device in the mounted state shown in FIG. 4 as viewed from an occupant side.

FIG. 4 is a schematic view of a state in which the side airbag device according to the first embodiment is mounted on the vehicle seat as viewed from the side of the vehicle. FIG. 5 is a schematic view of the side airbag device in the mounted state shown in FIG. 4 as viewed from the occupant side. As shown in FIG. 4, the airbag 2 is fixed to the side portion (e.g., the side frame 52) of the seat back 51 in a folded state before inflation and deployment, and is housed together with a cushion pad in a state of being covered with a cover of the seat back 51. The area defining the shape of the airbag in the folded state and including the gas inflow part (the inflator mounting part 10) is defined as a non-folding area 29.

Hereinafter, a method of folding the airbag 2 in the airbag device according to the first embodiment will be described with reference to FIGS. 6 to 13B. In FIGS. 6, 7A, 8A, 9 to 12, and 13A, the airbag 2 is arranged so that the front surface of each drawing becomes the inside in the vehicle width direction when the side airbag device 1 is attached to the side portion of the seat back 51.

Figure 6:
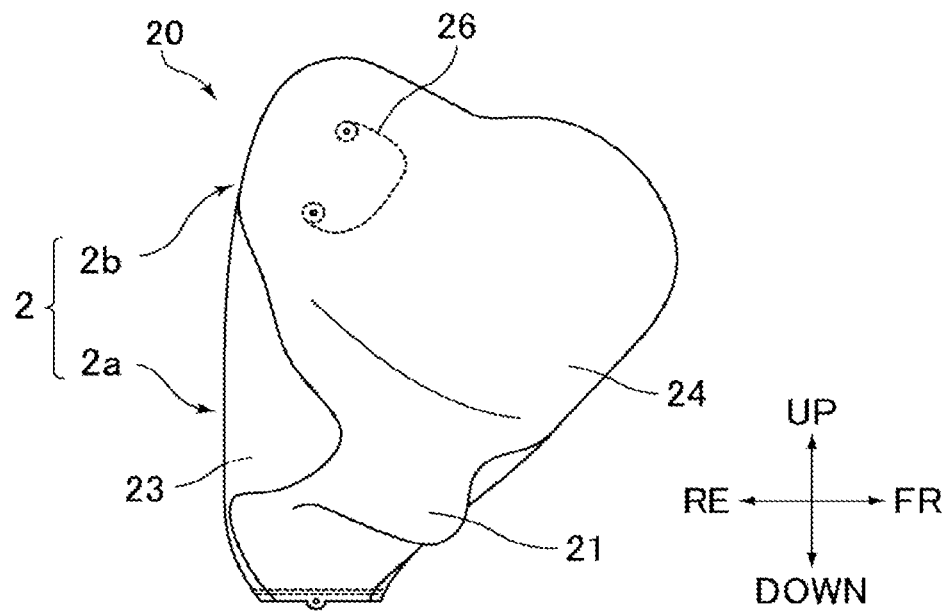
FIG. 6 is a first view for explaining a folding process of the airbag according to the first embodiment.

First, the connecting panel 25 is folded such that the connecting panel 25 protrudes outward of the outer peripheral edges of the occupant side panel 23 and the center side panel 24. The connecting panel 25 may be inserted between the occupant side panel 23 and the center side panel 24. FIG. 6 is a first view for explaining a folding process of the airbag according to the first embodiment. In FIG. 6, the airbag 2 is arranged so that the center side panel 24 arranged inward in the vehicle width direction during inflation and deployment is on the front side and the occupant side panel 23 arranged on the occupant 40 side during inflation and deployment is on the back side. The first inflation part 2a of the airbag 2 is located on the lower (DOWN), and the second inflation part 2b is located on the upper (UP). The portion of the connecting panel 25 defining the inflated protruding part 21 is not inserted between the occupant side panel 23 and the center side panel 24 and is folded at the next stage.

Figure 7A:
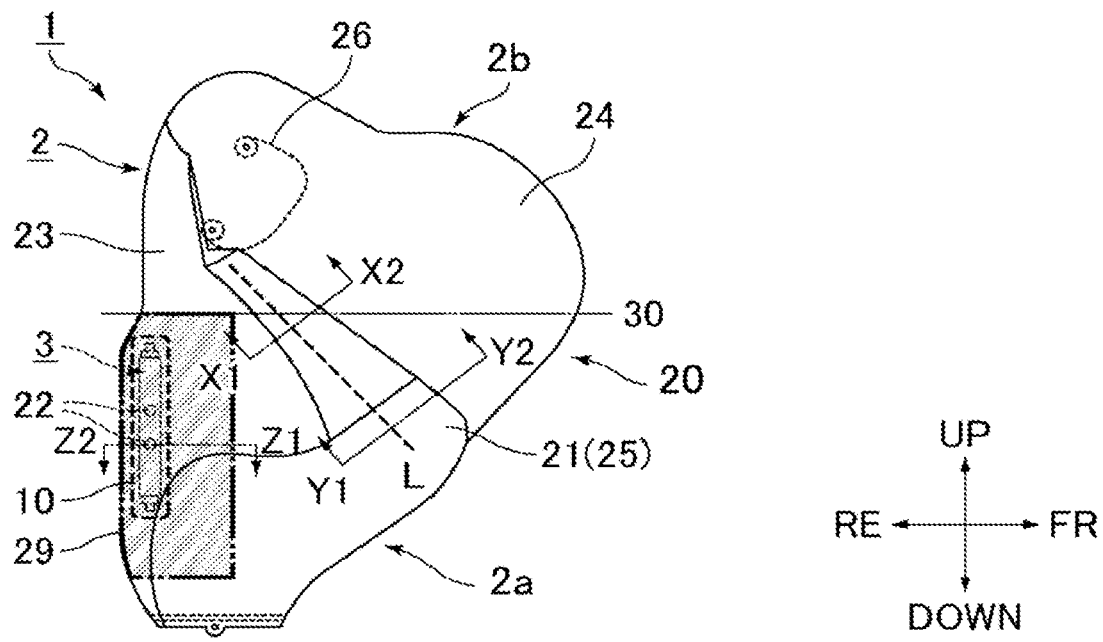
FIG. 7A is a second view for explaining the folding process of the airbag according to the first embodiment.
Figure 7B:
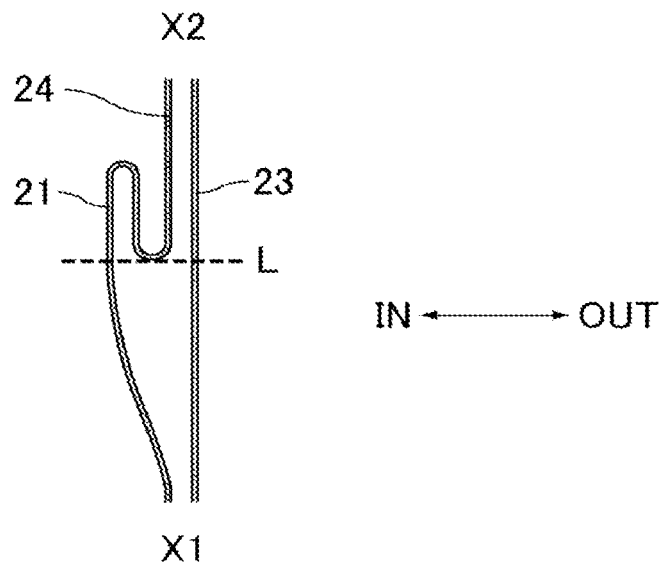
FIG. 7B is a sectional view taken along the line X1-X2 shown in FIG. 7A.
Figure 7C:
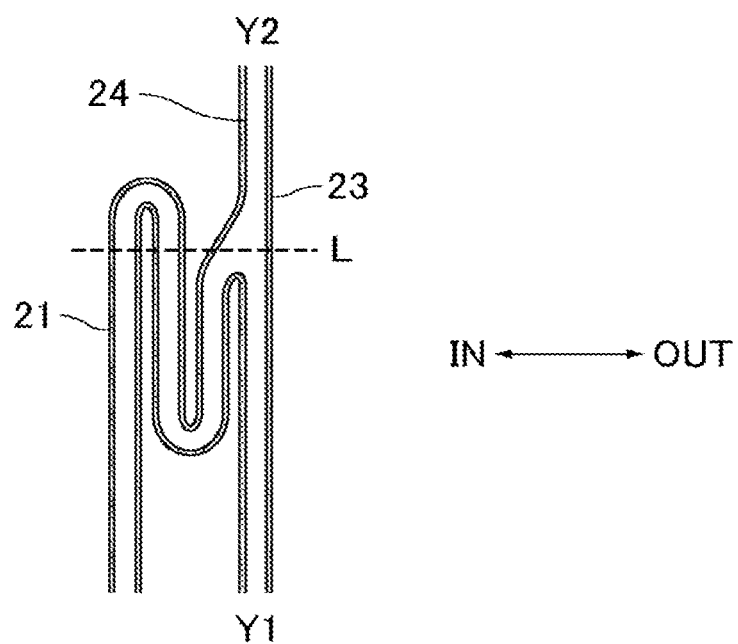
FIG. 7C is a sectional view taken along the line Y1-Y2 shown in FIG. 7A.
Figure 7D:
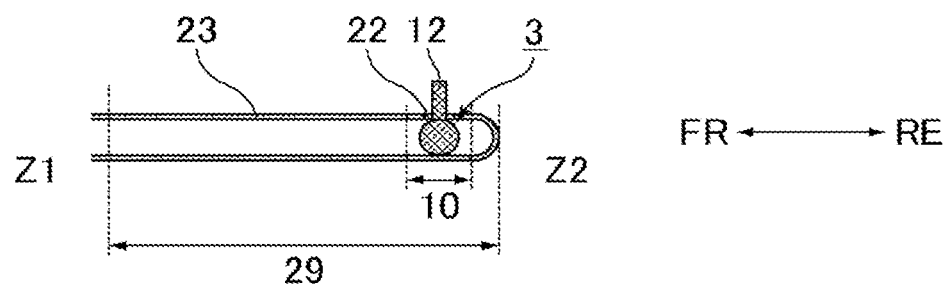
FIG. 7D is a sectional view taken along the line Z1-Z2 shown in FIG. 7A.

Subsequently, the inflated protruding part 21 is folded. FIG. 7A is a second view for explaining the folding process of the airbag according to the first embodiment. FIG. 7A shows a state in which the airbag 2 is partially unfolded to spread out into a flat surface. In FIG. 7A, the area corresponding to the non-folding area 29 of the airbag 2 in the folded state shown in FIG. 5 is represented by a shaded portion. FIGS. 7B, 7C and 7D are sectional views taken along the lines X1-X2, Y1-Y2, and Z1-Z2 shown in FIG. 7A, respectively. A dotted line L is a folding line when the inflated protruding part 21 is folded flat. As shown in FIGS. 7A to 7C, the inflated protruding part 21 is folded to overlap the main body part 20 along the folding line L. As shown in FIGS. 7B and 7C, the inflated protruding part 21 and the main body part 20 are separated by the folding line L. When gas is introduced from the gas inflow part provided in the main body part 20, the gas flows into the inflated protruding part 21 from the folding line L. The non-folding area 29 is an area including the gas inflow part in the folded state. Therefore, in the initial stage of inflation and deployment when the airbag 2 starts to inflate, the non-folding area 29 is filled with gas first, and then, the airbag 2 is unfolded to inflate and deploy in a vehicle front and rear direction or a vehicle upper and lower direction. As shown in FIGS. 7A and 7D, the folding line L does not overlap the non-folding area 29. Therefore, it is difficult for gas to flow into the inflated protruding part 21 at the initial stage of inflation and deployment of the airbag 2, so that the inflation and deployment speed of the main body part 20 in the vehicle front and rear direction or the vehicle upper and lower direction can be increased.

In the state where the airbag is partially unfolded to spread out into the flat surface, it is preferable that the folding line L does not overlap the non-folding area 29. Further, for example, as shown in FIG. 7A, the inflated protruding part 21 may be folded toward the front (FR) of the vehicle or may be folded toward the upper (UP) of the vehicle. Further, in the state where the airbag 2 is partially unfolded to spread out into the flat surface, the inflated protruding part 21 may be folded toward the front (FR) and the upper (UP), that is, diagonally forward of the vehicle.

As a method of folding the airbag 2 after folding the inflated protruding part 21, the airbag may be folded in the vehicle upper and lower direction and then in the vehicle front and rear direction, or may be folded in the vehicle front and rear direction and then in the vehicle upper and lower direction. In both folding methods, it is preferable that the inflated protruding part 21 and the main body part 20 are overlapped with each other in the folded state of the airbag 2, and the airbag 2 is further folded from the front (FR) toward the rear (RE) of the vehicle. Since the folding line L does not overlap the non-folding area 29, the inflation and deployment speed of the main body part 20 in the vehicle front and rear direction can be increased when the airbag is folded in the vehicle upper and lower direction and then in the vehicle front and rear direction, and the inflation and deployment speed of the main body part 20 in the vehicle front and rear direction can be increased when the airbag is folded in the vehicle front and rear direction and then in the vehicle upper and lower direction.

Figure 8A:
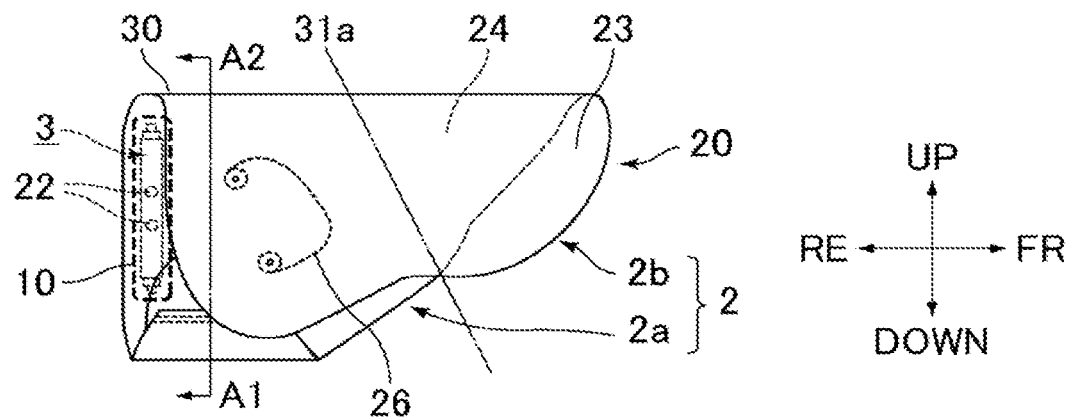
FIG. 8A is a third view for explaining the folding process of the airbag according to the first embodiment.
Figure 8B:
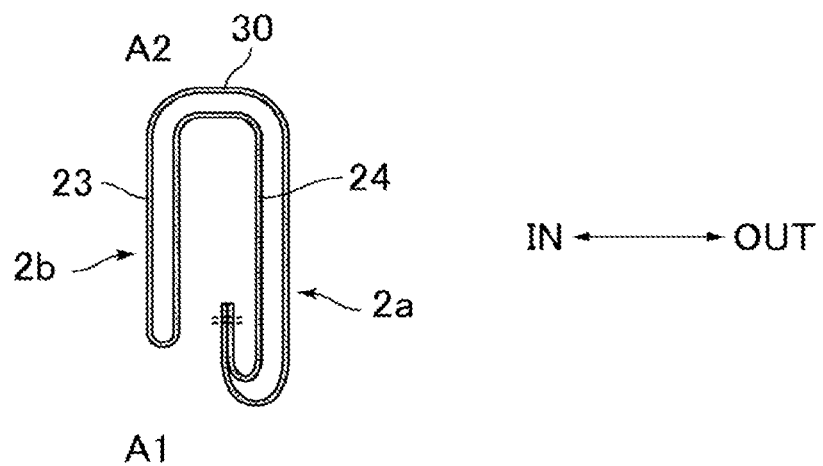
FIG. 8B is a sectional view taken along the line A1-A2 shown in FIG. 8A.

Hereinafter, an example of the method of folding the airbag in the vehicle upper and lower direction and then folding the airbag in the vehicle front and rear direction will be described. FIG. 8A is a third view for explaining the folding process of the airbag according to the first embodiment. FIG. 8B is a sectional view taken along the line A1-A2 shown in FIG. 8A. As shown in FIG. 8A, the main body part 20 that is located on the side of the center side panel 24 arranged inward in the vehicle width direction is folded from the upper (UP) toward the lower (DOWN) of the vehicle during inflation and deployment. The second inflation part 2b, which is an upper portion of the airbag 2, is folded to overlap the first inflation part 2a such that the second inflation part 2b is arranged in the front surface of FIG. 8A, that is, inward in the vehicle width direction. By folding the second inflation part 2b in this way, in the folded state of the airbag 2, the second inflation part 2b is folded to overlap the first inflation part 2a such that the second inflation part 2b is arranged inward of the first inflation part 2a in the vehicle width direction. Preferably, the second inflation part 2b overlaps at least a portion of the first inflation part 2a. In other words, the second inflation part 2b, which is an upper portion of the airbag 2, is folded to overlap the inflated protruding part 21 such that the second inflation part 2b is arranged in the front surface of FIG. 8A, that is, inward in the vehicle width direction. Further, in the folded state of the airbag 2, the main body part 20 is folded to overlap the inflated protruding part 21 such that the main body part 20 is arranged inward of the inflated protruding part 21 in the vehicle width direction. Preferably, the main body part 20 overlaps at least a portion of the inflated protruding part 21. As shown in FIGS. 8A and 8B, the length in the folded state of the airbag 2 in the vehicle upper and lower direction may be adjusted by folding the lower of the main body part 20 upward. A folded-back line in which the lower of the main body part 20 is folded upward may be a lower end (an end on the lower of the vehicle) of the non-folding area 29, as shown in FIG. 7A.

When the inflator mounting part 10 is arranged in the first inflation part 2a, which is a lower portion of the main body part, the first inflation part 2a is inflated prior to the second inflation part 2b during inflation and deployment. When the second inflation part 2b is folded to overlap the first inflation part 2a, the first inflation part 2a is inflated and deployed while pushing up the overlapping second inflation part 2b toward the upper of the vehicle. Therefore, the second inflation part 2b can be inflated and deployed toward the upper of the vehicle. Further, since the first inflation part 2a and the second inflation part 2b are folded inward of the occupant 40 in the vehicle width direction, in other words, on the opposite side of the occupant 40, the airbag 2 can be prevented from being sandwiched between the occupant 40 and the console box 60 during inflation and deployment. Further, since the gas starts to flow into the inflated protruding part 21 after the main body part 20 starts to inflate and deploy, the deployment speed of the airbag in the vehicle front and rear direction is not easily impaired. The inflated protruding part 21 is inflated and deployed along the upper surface of the console box 60 to be in contact with the upper surface of the console box 60.

Preferably, the airbag 2 has a first folded-back line 30 in which the second inflation part 2*b* is folded back toward the lower (DOWN) of the vehicle to overlap the first inflation part 2*a*. The second inflation part 2*b* is folded to overlap the first inflation part 2*a* along the first folded-back line 30. The boundary between the first inflation part 2*a* and the second inflation part 2*b* does not have to coincide with the first folded-back line 30. As shown in FIG. 7A, the first folded-back line 30 may be arranged along an upper end (an end on the upper of the vehicle) of the non-folding area 29.

Figure 9:
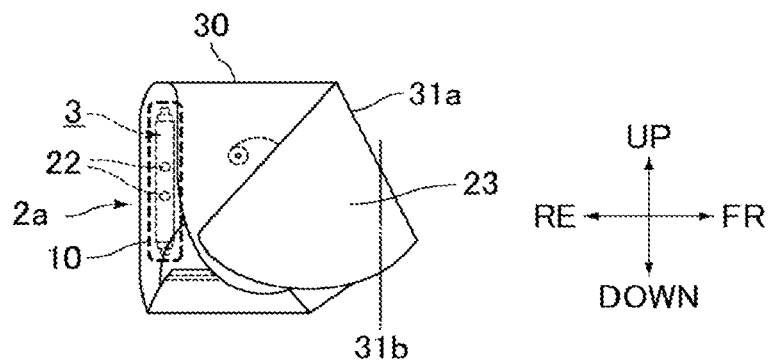
FIG. 9 is a fourth view for explaining the folding process of the airbag according to the first embodiment.
Figure 10:
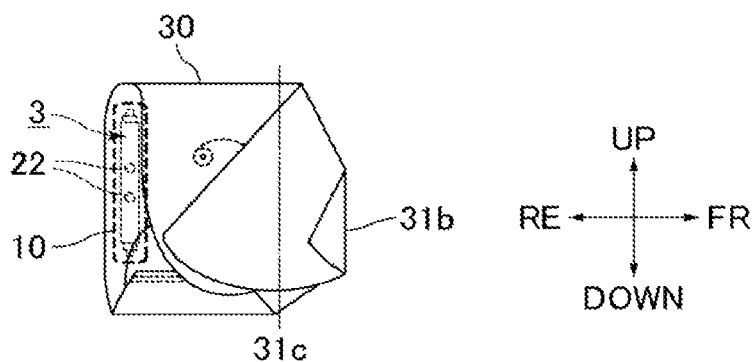
FIG. 10 is a fifth view for explaining the folding process of the airbag according to the first embodiment.
Figure 11:
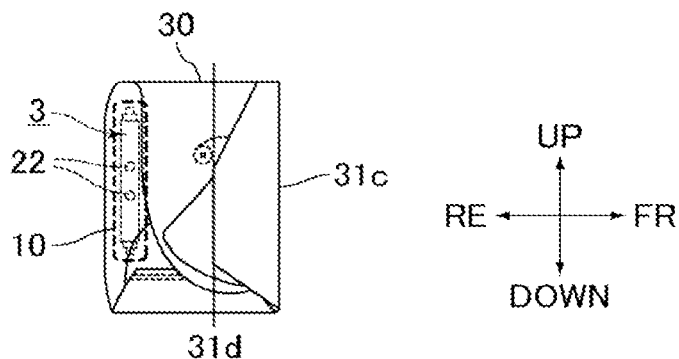
FIG. 11 is a sixth view for explaining the folding process of the airbag according to the first embodiment.
Figure 12:
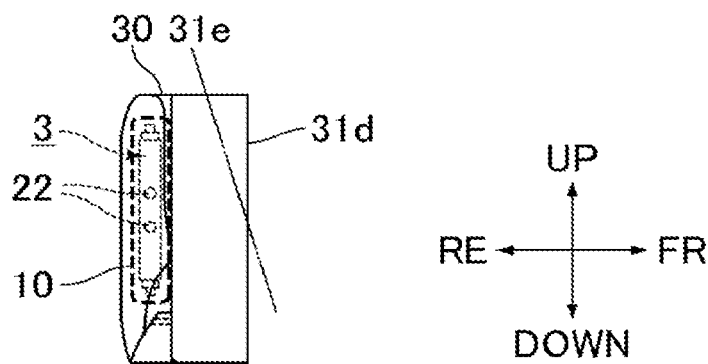
FIG. 12 is a seventh view for explaining the folding process of the airbag according to the first embodiment.

FIG. 9 is a fourth view for explaining the folding process of the airbag according to the first embodiment. As shown in FIG. 9, in the side airbag device 1, in the folded state of the airbag 2, the first inflation part 2*a* and the second inflation part 2*b* are preferably further folded from the front (FR) to the rear (RE) of the vehicle in a state of being overlapped with each other. That is, it is preferable that the airbag 2 has a second folded-back line 31*a* in which the first inflation part 2*a* and the second inflation part 2*b* are folded back from the front (FR) toward the rear (RE) of the vehicle. In this way, the number of folds from the front (FR) to the rear (RE) of the vehicle can be reduced. It is sufficient that at least a portion of the first inflation part 2*a* and the second inflation part 2*b* overlap each other. In other words, in the side airbag device 1, in the folded state of the airbag 2, the main body part 20 and the inflated protruding part 21 are preferably further folded from the front (FR) to the rear (RE) of the vehicle in a state of being overlapped with each other. Further, it is preferable that the airbag 2 has the second folded-back line 31*a* in which the main body part 20 and the inflated protruding part 21 are folded back from the front (FR) toward the rear (RE) of the vehicle.

FIGS. 10, 11, 12 and 13A are fifth to eighth views for explaining the folding process of the airbag according to the first embodiment, respectively. FIG. 13B is a sectional view taken along the line B1-B2 shown in FIG. 13A. The airbag 2 is preferably folded at least once from the front (FR) toward the rear (RE) of the vehicle by the second folded-back line 31*a*. However, as shown in FIGS. 10 to 13A, the main body part 20 and the inflated protruding part 21 may be further folded back a plurality of times from the front toward the rear of the vehicle after the airbag 2 is folded back at the second folded-back line 31*a*. FIGS. 10 to 13A exemplify a case where the airbag is folded back from the front toward the rear of the vehicle at a second folded-back line 31*b*, a second folded-back line 31*c*, a second folded-back line 31*d* and a second folded-back line 31*e*. The folding method after the airbag is folded back at the second folded-back line 31*a* is not particularly limited. The number of folds may be different, or the airbag may be bellows-folded from the front toward the rear of the vehicle. Further, as shown in FIG. 13B, the airbag may be roll-folded from the front toward the rear of the vehicle.

Figure 13A:
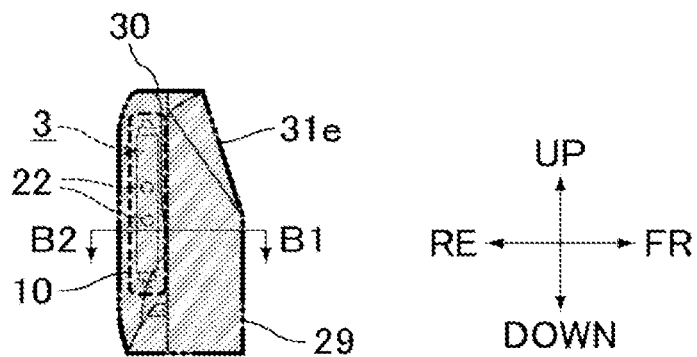
FIG. 13A is an eighth view for explaining the folding process of the airbag according to the first embodiment.
Figure 13B:
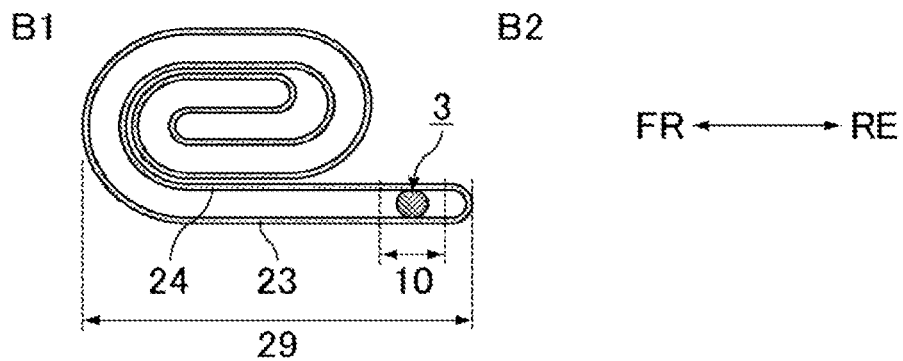
FIG. 13B is a sectional view taken along the line B1-B2 shown in FIG. 13A.

FIGS. 13A and 13B show the folded state of the airbag 2. The airbag 2 is attached to the side portion of the seat back 51 in the folded state shown in FIGS. 13A and 13B. The inflated protruding part 21 is included in the roll-folded portion of FIG. 13B. In the mounted state of the side airbag device 1, the airbag 2 may be folded such that the inflated protruding part 21 does not overlap the gas inflow part (the inflator mounting part 10), or may be folded such that the inflated protruding part 21 overlaps the gas inflow part in a state of being included in the roll-folded portion.

Figure 14A:
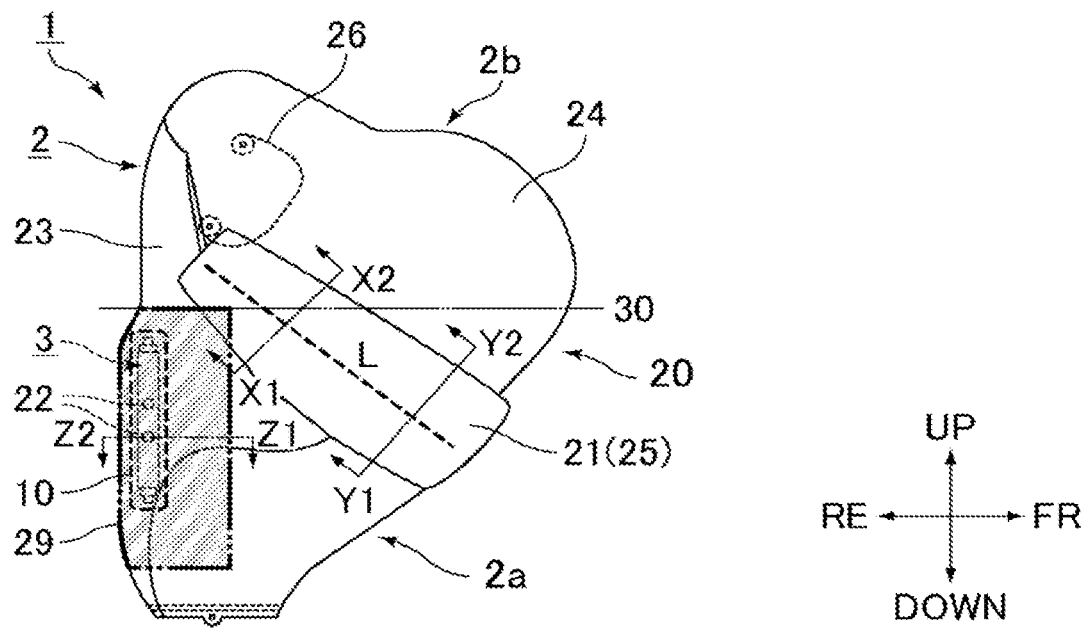
FIG. 14A is a schematic view showing a first modification of a folding method of an inflated protruding part shown in FIG. 7A.
Figure 14B:
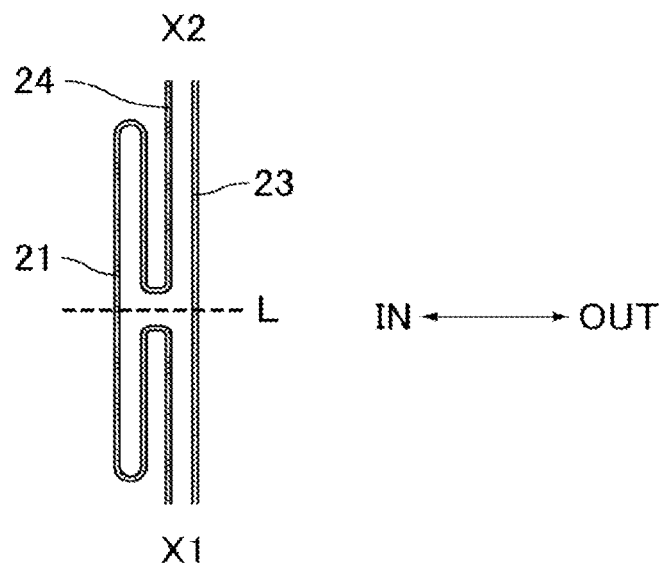
FIG. 14B is a sectional view taken along the line X1-X2 shown in FIG. 14A.
Figure 14C:
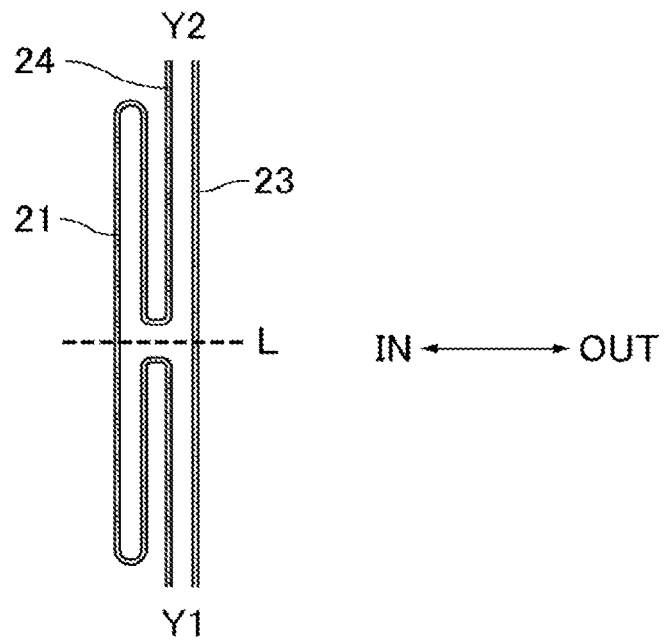
FIG. 14C is a sectional view taken along the line Y1-Y2 shown in FIG. 14A.
Figure 14D:
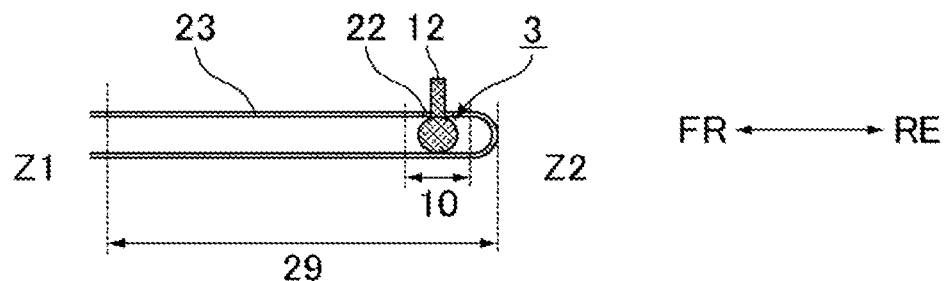
FIG. 14D is a sectional view taken along the line Z1-Z2 shown in FIG. 14A.
Figure 15A:
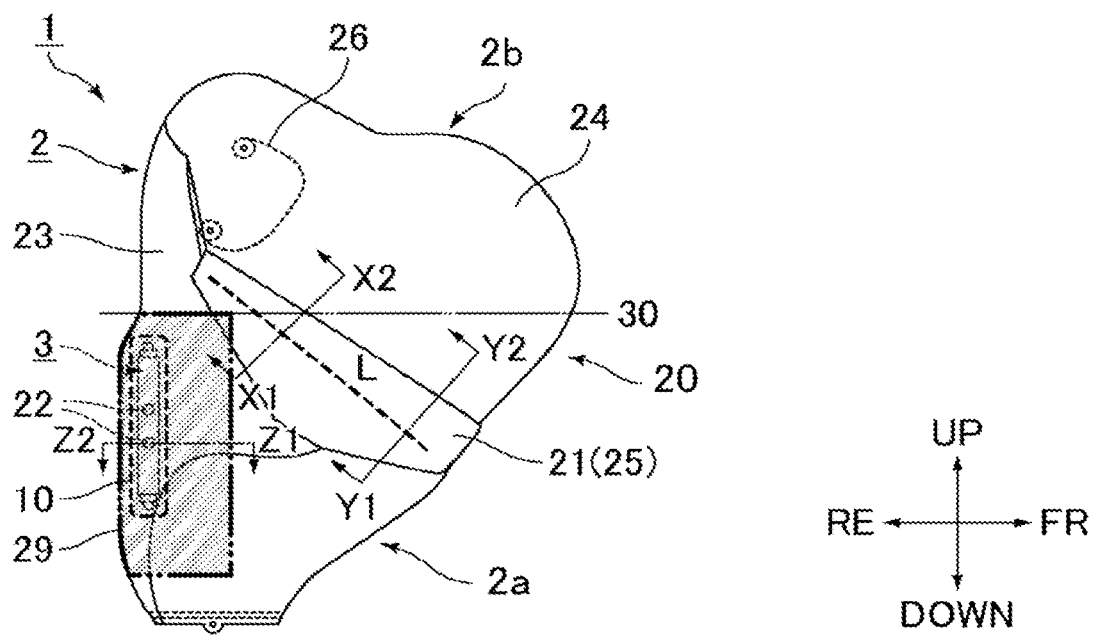
FIG. 15A is a schematic view showing a second modification of the folding method of the inflated protruding part shown in FIG. 7A.
Figure 15B:
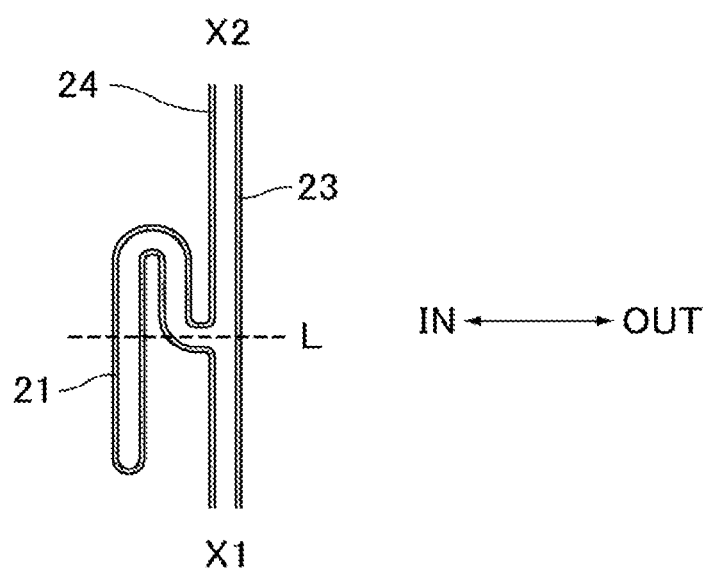
FIG. 15B is a sectional view taken along the line X1-X2 shown in FIG. 15A.
Figure 15C:
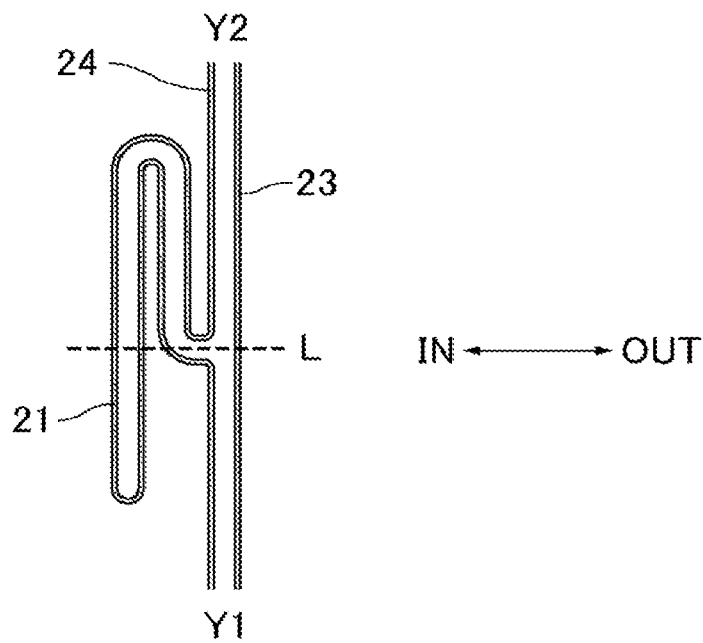
FIG. 15C is a sectional view taken along the line Y1-Y2 shown in FIG. 15A.
Figure 15D:
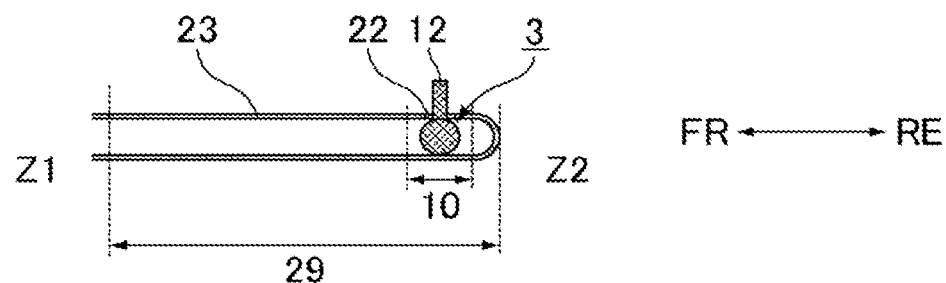
FIG. 15D is a sectional view taken along the line Z1-Z2 shown in FIG. 15A.
Figure 16A:
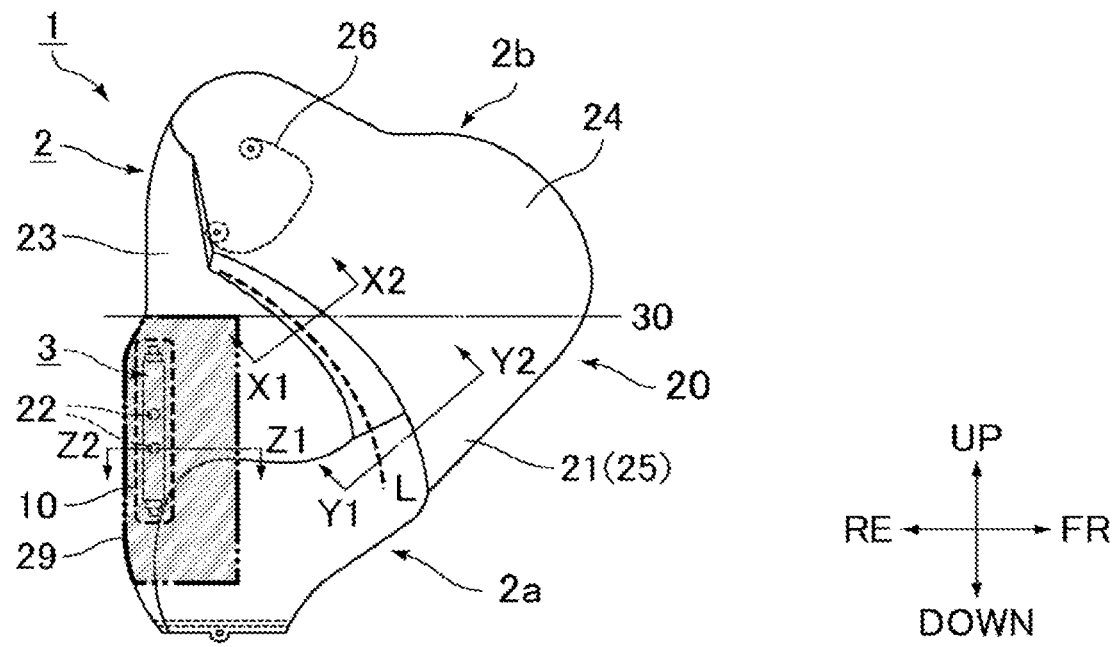
FIG. 16A is a schematic view showing third modification of the folding method of the inflated protruding part shown in FIG. 7A.
Figure 16B:
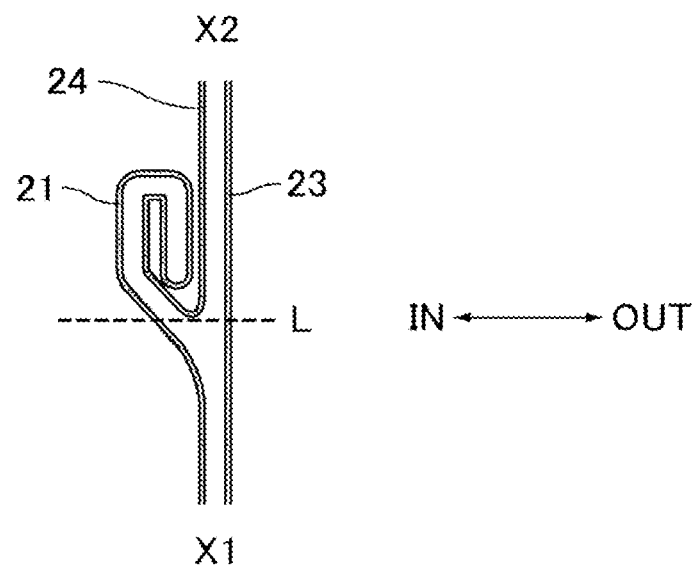
FIG. 16B is a sectional view taken along the line X1-X2 shown in FIG. 16A.
Figure 16C:
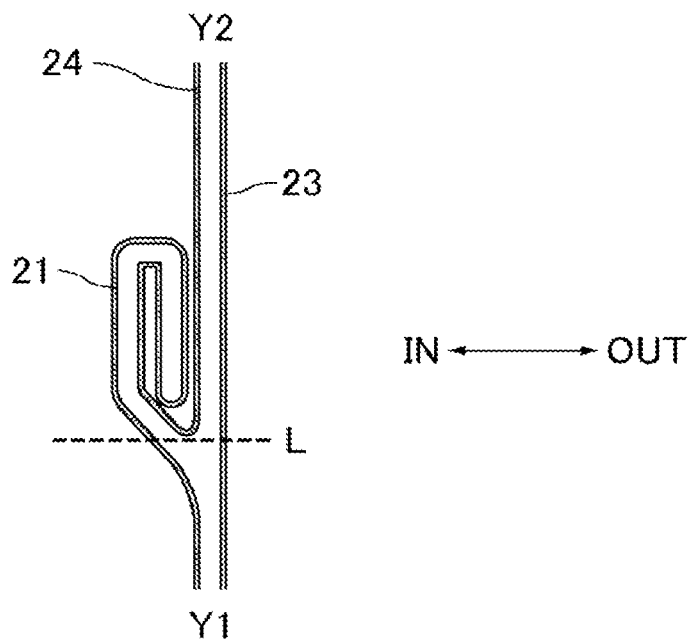
FIG. 16C is a sectional view taken along the line Y1-Y2 shown in FIG. 16A.
Figure 16D:
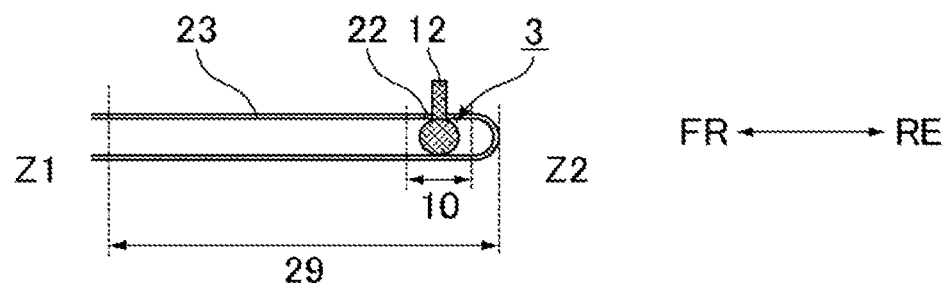
FIG. 16D is a sectional view taken along the line Z1-Z2 shown in FIG. 16A.
Figure 17A:
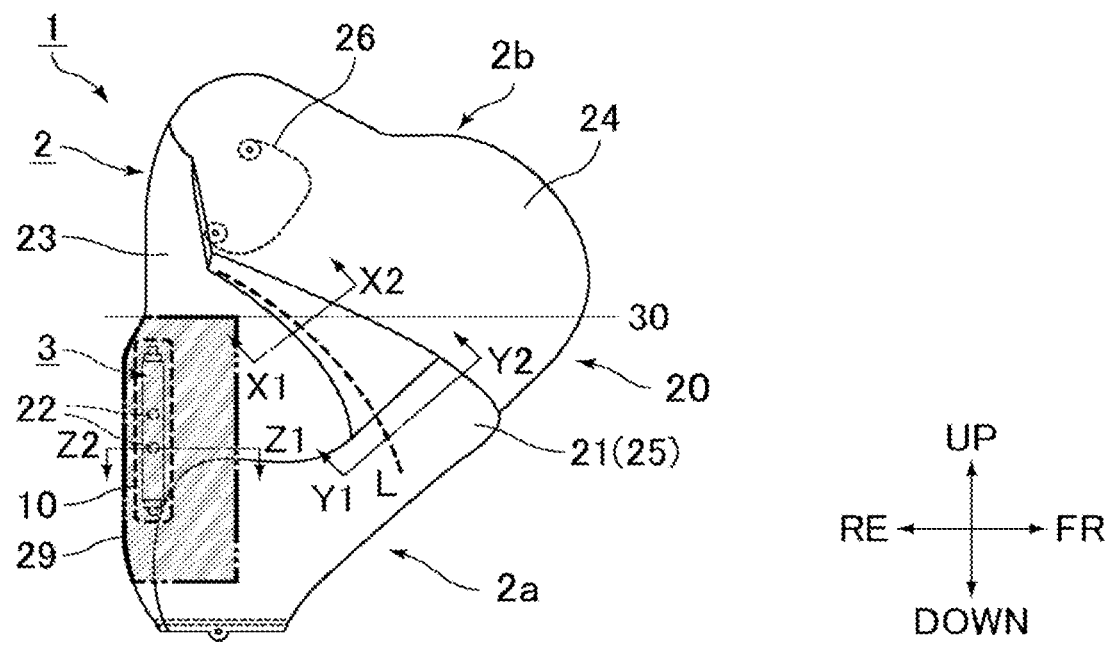
FIG. 17A is a schematic view showing a fourth modification of the folding method of the inflated protruding part shown in FIG. 7A.
Figure 17B:
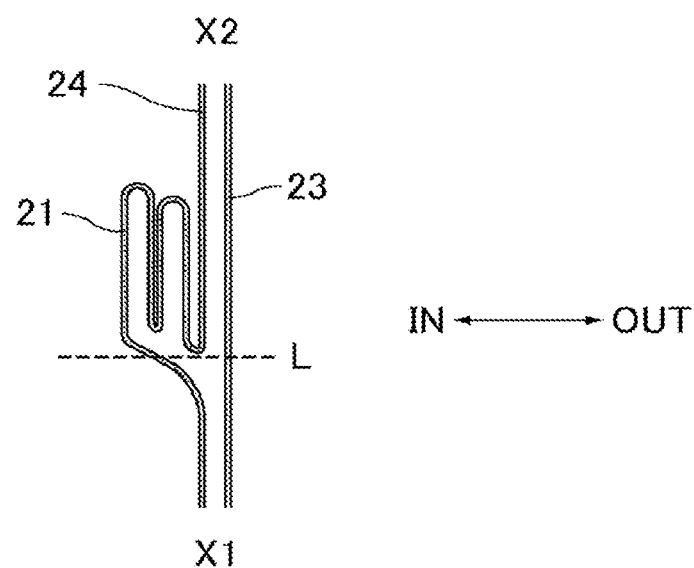
FIG. 17B is a sectional view taken along the line X1-X2 shown in FIG. 17A.
Figure 17C:
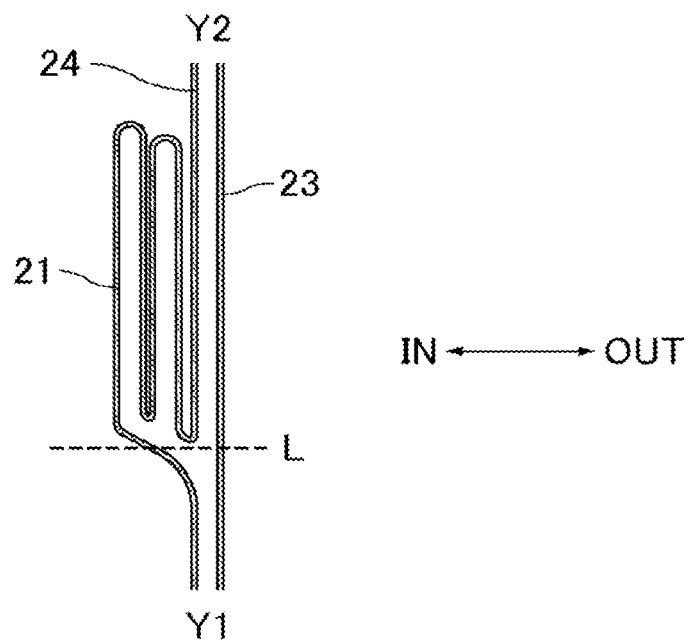
FIG. 17C is a sectional view taken along the line Y1-Y2 shown in FIG. 17A.
Figure 17D:
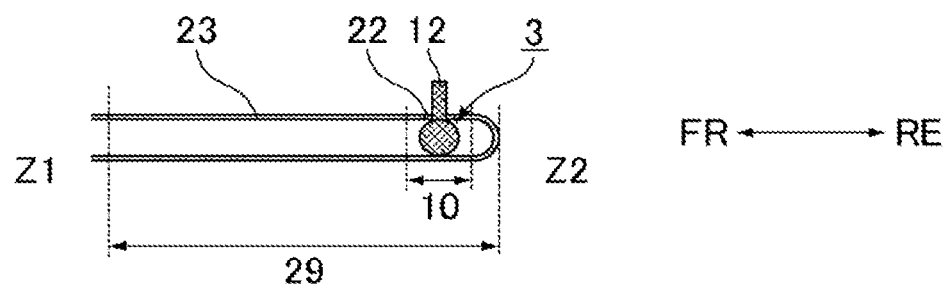
FIG. 17D is a sectional view taken along the line Z1-Z2 shown in FIG. 17A.

The folding method of the inflated protruding part 21 is not limited to that shown in FIG. 7A. FIGS. 14A, 15A, 16A and 17A are schematic views showing first to fourth modifications of the folding method of the inflated protruding part shown in FIG. 7A, respectively. FIGS. 14A, 15A, 16A and 17A show a state in which the airbag 2 is partially unfolded to spread out into a flat surface. In FIGS. 14A, 15A, 16A and 17A, the airbag 2 is arranged such that the center side panel 24 arranged inward in the vehicle width direction during inflation and deployment is on the front side and the occupant side panel 23 arranged on the occupant 40 side during inflation and deployment is on the back side. FIGS. 14B, 14C and 14D are sectional views taken along the lines X1-X2, Y1-Y2, and Z1-Z2 shown in FIG. 14A, respectively. FIGS. 15B, 15C and 15D are sectional views taken along the lines X1-X2, Y1-Y2, and Z1-Z2 shown in FIG. 15A, respectively. FIGS. 16B, 16C and 16D are sectional views taken along the lines X1-X2, Y1-Y2, and Z1-Z2 shown in FIG. 16A, respectively. FIGS. 17B, 17C and 17D are sectional views taken along the lines X1-X2, Y1-Y2, and Z1-Z2 shown in FIG. 17A, respectively.

As in the first modification shown in FIGS. 14A to 14D, the inflated protruding part 21 may be folded flat. As in the second modification shown in FIGS. 15A to 15D, the inflated protruding part 21 may be folded upward, and then, a part of the inflated protruding part 21 folded upward may be folded back downward. As in the third modification shown in FIGS. 16A to 16D, the inflated protruding part 21 may be roll-folded upward in a winding manner. As in the fourth modification shown in FIGS. 17A to 17D, the inflated protruding part 21 may be folded flat as in FIG. 7A, and then, the lower of the inflated protruding part 21 may be folded upward in an overlapping manner. As shown in FIGS. 14A to 14C, 15A to 15C, 16A to 16C, and 17A to 17C, in any of the first to fourth modifications, the inflated protruding part 21 is folded to overlap the main body part 20 along the folding line L. Further, as shown in FIGS. 14A, 14D, 15A, 15D, 16A, 16D, 17A, and 17D in any of the first to fourth modifications, the folding line L does not overlap the non-folding area 29.

The first folded-back line 30 is preferably provided below the shoulder 45 of the occupant 40 (a center of the shoulder 45 of the occupant 40, i.e., a rotation center of the shoulder of the international unified side impact dummy). When the first folded-back line 30 is provided below the center of the shoulder 45 of the occupant 40, the first inflation part 2*a* is inflated and deployed along the lower of the arm 44 of the occupant 40. Since the second inflation part 2*b* is repelled by the inflated first inflation part 2*a* and is inflated and deployed to be pushed upward, the second inflation part 2*b* is inflated and deployed along the side portions of the arm 44 and the shoulder 45 of the occupant 40 while being pressed toward the occupant 40.

The first folded-back line 30 is preferably provided above the upper surface of the console box 60. When the first folded-back line 30 is preferably provided above the upper surface of the console box 60, the airbag 2 can be prevented from being sandwiched between the occupant 40 and the console box 60 during inflation and deployment of the airbag 2.

Figure 18A:
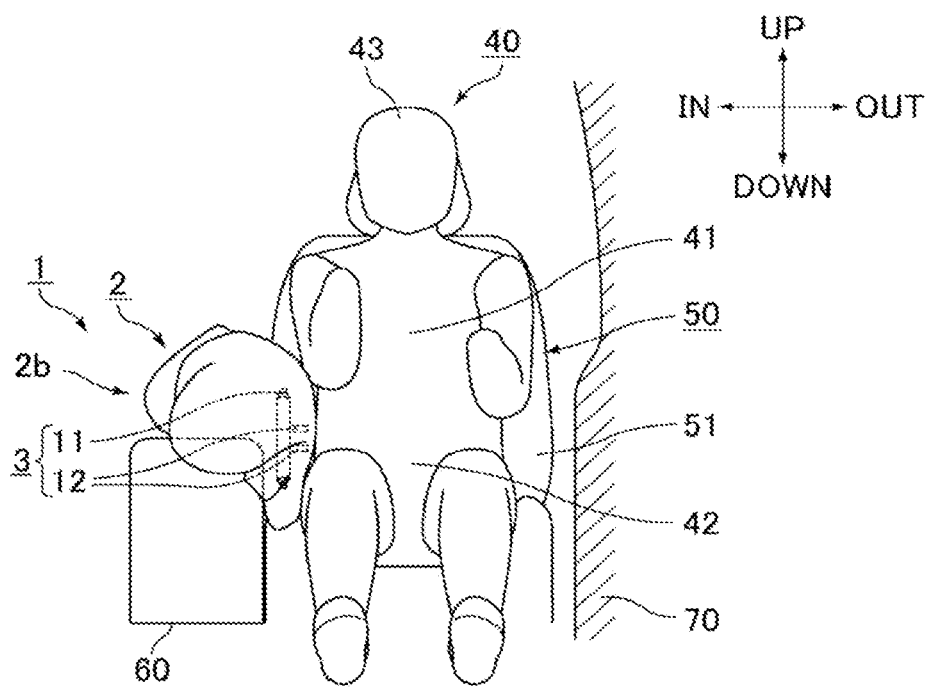
FIG. 18A is a first view for explaining a process of inflating and deploying the side airbag device according to the first embodiment.

Hereinafter, the process of inflating and deploying the side airbag device 1 will be described with reference to FIGS. 18A to 18D, and 1. FIGS. 18A to 18D are first to fourth views for explaining the process of inflating and deploying the side airbag device according to the first embodiment. When a vehicle collides with an obstacle to activate the inflator 3, the gas generated from the inflator 3 is introduced into the main body part 20 from the gas inflow part to which the inflator 3 is attached, and the non-folding area 29 shown in FIGS. 13A and 13B is filled with the gas. Since the folding line L in which the inflated protruding part 21 is folded does not overlap the non-folding area 29 as shown in FIGS. 7A and 7D, the gas does not flow into the inflated protruding part 21, but flows into the main body part 20. When the gas is introduced into the main body part 20, the roll-folded portion shown in FIGS. 13A and 13B is unfolded, and the gas flows into the main body part 20 (the first inflation part 2a) of the unfolded portion, and the first inflation part 2a starts to inflate. The cover of the seat back 51 is ruptured by the force applied from the inflated airbag 2. Then, as shown in FIG. 18A, the airbag 2 starts to inflate and deploy toward the front of the vehicle in order from the unfolded portion.

Figure 18B:
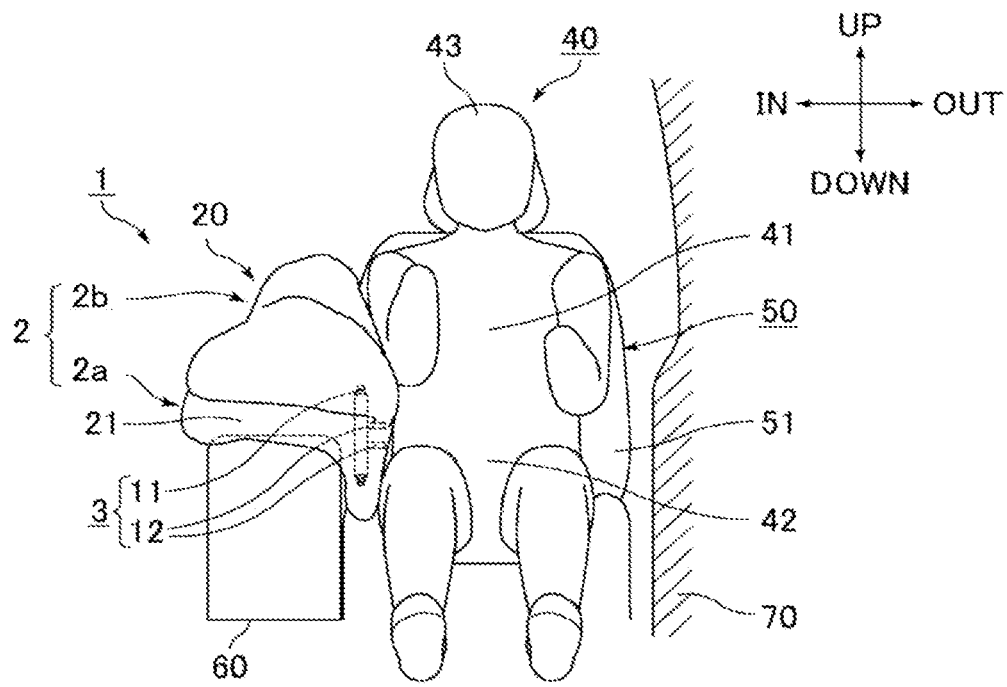
FIG. 18B is a second view for explaining the process of inflating and deploying the side airbag device according to the first embodiment.

As shown in FIG. 18B, the first inflation part 2a is inflated and deployed beside the body 41 of the occupant 40. The first inflation part 2a is inflated and deployed while pushing up the second inflation part 2b that overlaps the first inflation part 2a in the folded state. When the main body part 20 starts to inflate and deploy, gas flows into the inflated protruding part 21 from the folding line L shown in FIG. 7A, and the inflated protruding part 21 starts to inflate and deploy so as to come into contact with the upper surface of the console box 60. Since the folding line L does not overlap the non-folding area 29, and thus, the main body part 20 is inflated and deployed prior to the inflated protruding part 21, the inflation and deployment speed of the main body part 20 in the vehicle front and rear direction can be increased. Further, since the folding line L and the inflated protruding part 21 are included in the roll-folded portion, the inflated protruding part 21 is less likely to inflate, and the inflation and deployment speed of the main body part 20 in the vehicle front and rear direction can be further increased.

Figure 18C:
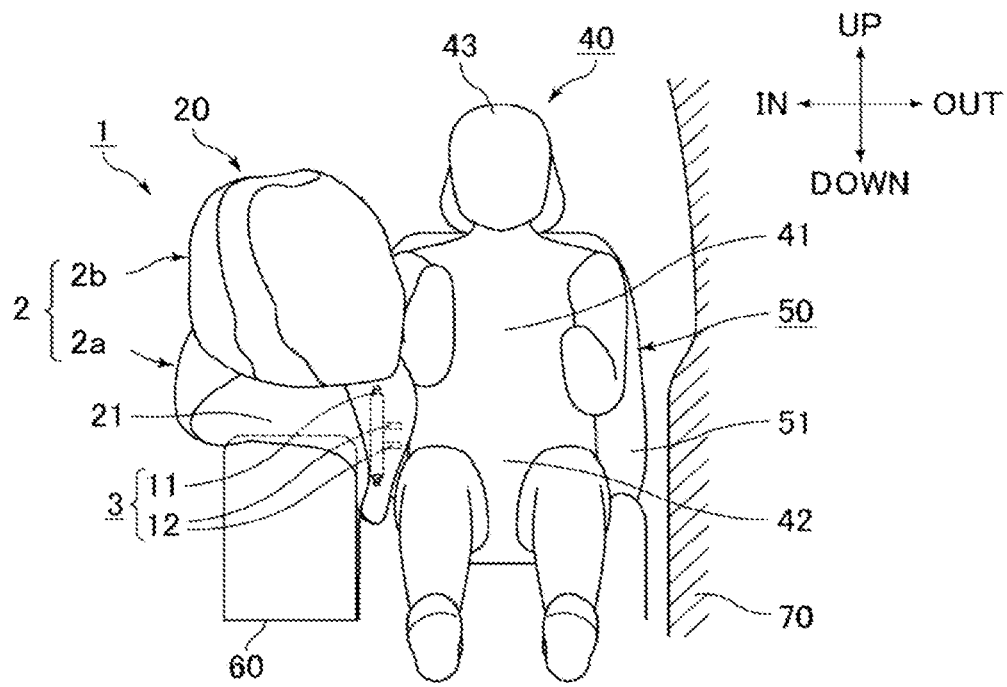
FIG. 18C is a third view for explaining the process of inflating and deploying the side airbag device according to the first embodiment.

As shown in FIG. 18C, the second inflation part 2b is inflated and deployed by the gas introduced from the first inflation part 2a after the first inflation part 2a is inflated and deployed. As a portion of the first inflation part 2a (i.e., the inflated protruding part 21) comes into contact with the upper surface of the console box 60, the second inflation part 2b is repelled from the first inflation part 2a supported on the console box 60 and is inflated and deployed toward the upper of the vehicle.

Figure 18D:
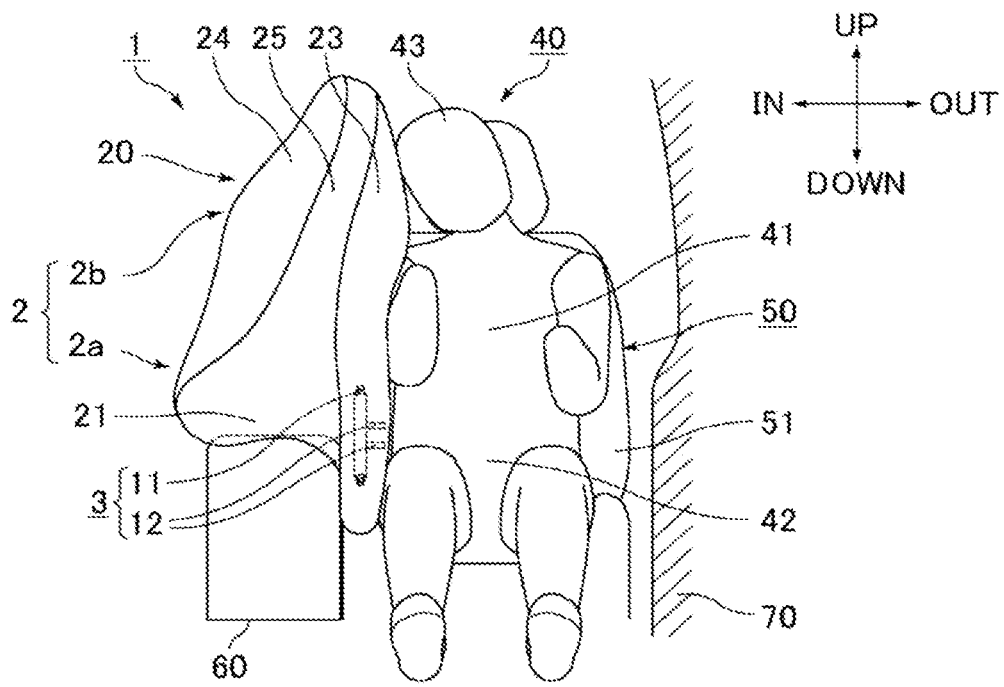
FIG. 18D is a fourth view for explaining the process of inflating and deploying the side airbag device according to the first embodiment.

As shown in FIG. 18D, the second inflation part 2b is repelled from the first inflation part 2a supported on the console box 60 and is further inflated and deployed toward the upper of the vehicle along the arm 44 and the shoulder 45 of the occupant 40 while being pressed against the occupant 40. Since the second inflation part 2b is inflated and deployed from the inside in the vehicle width direction so as to dodge the arm 44 and the shoulder 45 of the occupant 40, it is possible to prevent the airbag 2 from being flipped up by the arm 44 of the occupant 40.

Thereafter, as shown in FIG. 1, the airbag 2 receives the side portion of the body 41 of the occupant 40 at the first inflation part 2a and receives the head 43 of the occupant 40 at the second inflation part 2b. Since a portion of the first inflation part 2a (i.e., the inflated protruding part 21) comes into contact with the upper surface of the console box 60, the airbag 2 does not easily deviate to the vehicle lower direction or the inward direction in the vehicle width direction. Further, since the second inflation part 2b restrains the arm 44 of the occupant 40, the occupant 40 can be sufficiently restrained.

Second Embodiment

Figure 19:
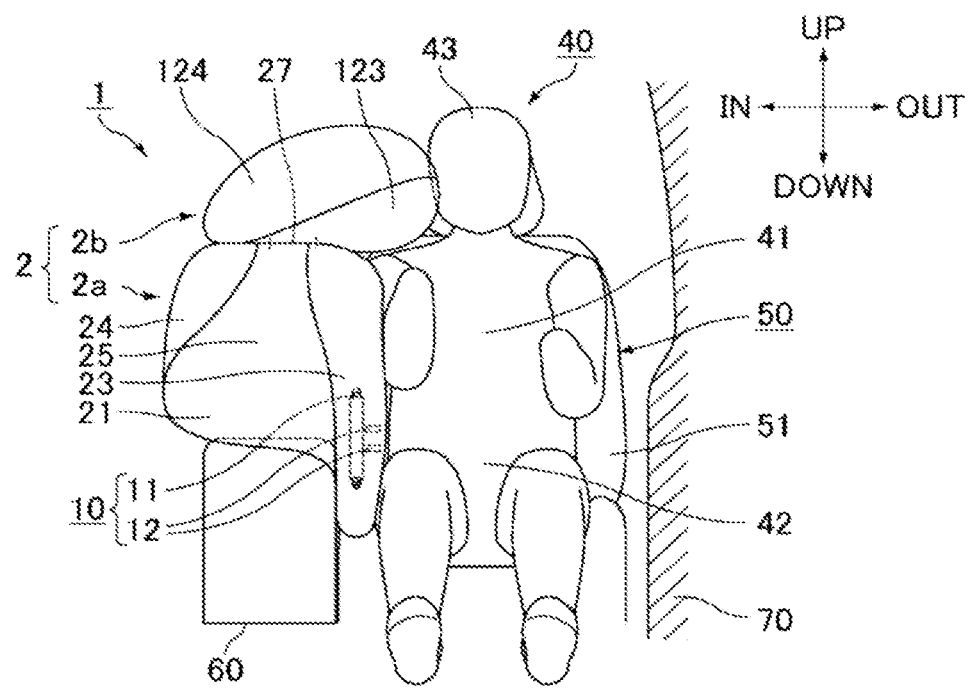
FIG. 19 is a schematic view showing a state of a side airbag device according to a second embodiment when an occupant is restrained by an airbag as viewed from the front of a vehicle.
Figure 21A:
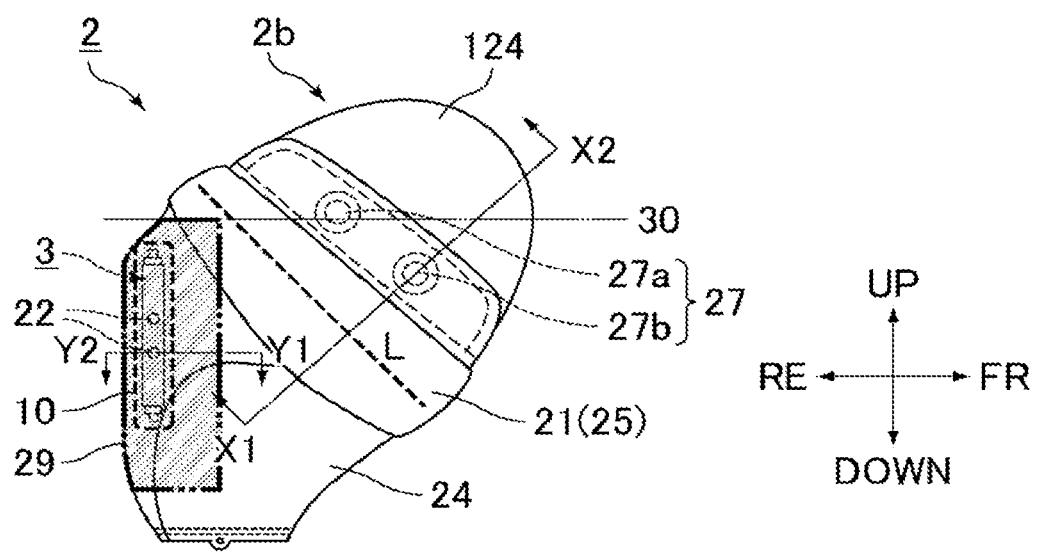
FIG. 21A is a second view for explaining the folding process of the airbag according to the second embodiment.
Figure 21B:
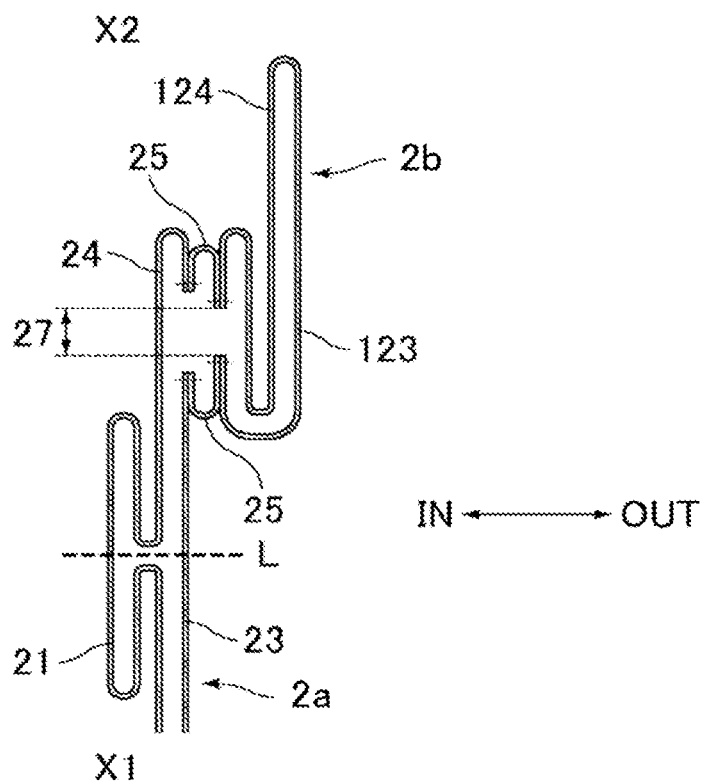
FIG. 21B is a sectional view taken along the line X1-X2 shown in FIG. 21A.

In a side airbag device of a second embodiment, an airbag includes a plurality of bag-shaped airbags. FIG. 19 is a schematic view showing a state of the side airbag device according to the second embodiment when an occupant is restrained by the airbag as viewed from the front of the vehicle. As shown in FIG. 19, in the side airbag device of the second embodiment, the airbag 2 includes the first inflation part 2a and the second inflation part 2b. The first inflation part 2a and the second inflation part 2b are different bag-shaped airbags. The gas inflow part (the inflator mounting part 10) is arranged in the first inflation part 2a, which is a lower portion of the airbag 2, and the inflated protruding part 21 is located inward of the first inflation part 2a in the vehicle width direction. As shown in FIGS. 19 and 21B described later, the first inflation part 2a and the second inflation part 2b communicate with each other through a gas flow hole 27. During inflation and deployment, the first inflation part 2a is inflated and deployed by the gas generated from the inflator 3, and the gas flows into the second inflation part 2b through the gas flow hole 27. In this way, the second inflation part 2b is inflated and deployed.

Similar to the first embodiment, the first inflation part 2a may include the occupant side panel 23, the center side panel 24, and the connecting panel 25. The second inflation part 2b may include an occupant side panel 123 arranged on the occupant 40 side during inflation and deployment, and a center side panel 124 arranged to face the occupant side panel 123.

Hereinafter, a method of folding the airbag 2 in the airbag device of the second embodiment will be described with reference to FIGS. 20 to 24C. In the second embodiment, an example of the method of folding the airbag in the vehicle front and rear direction and then folding the airbag in the vehicle upper and lower direction will be described. FIGS. 20 to 24C are first to fifth views for explaining the process of folding the airbag according to the second embodiment. In FIGS. 20, 21A, 22, 23A and 24A, the airbag 2 is arranged so that the front surface of each drawing becomes the inside in the vehicle width direction when the side airbag device 1 is attached to the side portion of the seat back 51.

Figure 20:
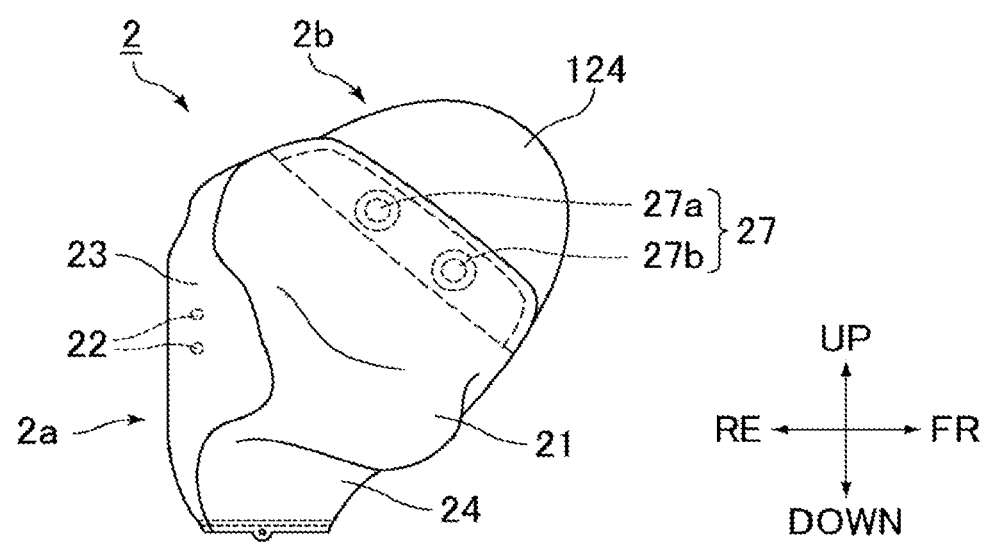
FIG. 20 is a first view for explaining a folding process of the airbag according to the second embodiment.

In the second embodiment, a bag-shaped airbag defining the first inflation part 2a and a bag-shaped airbag defining the second inflation part 2b are sewn together in an overlapping manner. As shown in FIG. 20, when the first inflation part 2a is arranged on the front side, the second inflation part 2b located on the back side is folded up from the lower to the upper.

Figure 21C:
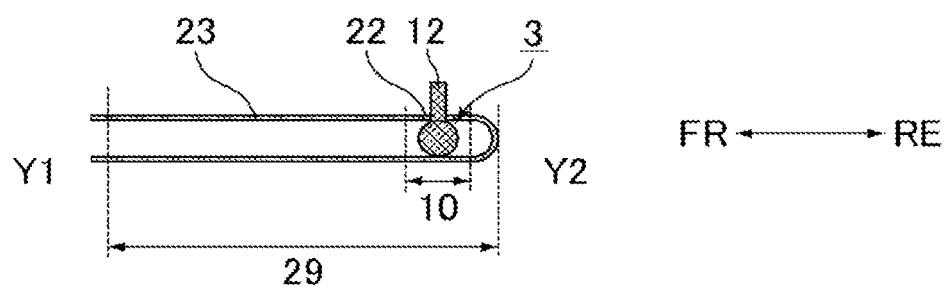
FIG. 21C is a sectional view taken along the line Y1-Y2 shown in FIG. 21A.

Subsequently, the inflated protruding part 21 is folded. As shown in FIGS. 21A to 21C, a portion of the first inflation part 2a (i.e., the inflated protruding part 21) may be folded flat. The folding method shown in FIGS. 21A to 21C is a folding method corresponding to the first modification of the first embodiment. FIGS. 21B and 21C are sectional views taken along the lines X1-X2 and Y1-Y2 shown in FIG. 21A, respectively. The inflated protruding part 21 is folded to overlap the main body part 20 along the folding line L, and the folding line L does not overlap the non-folding area 29.

Figure 22:
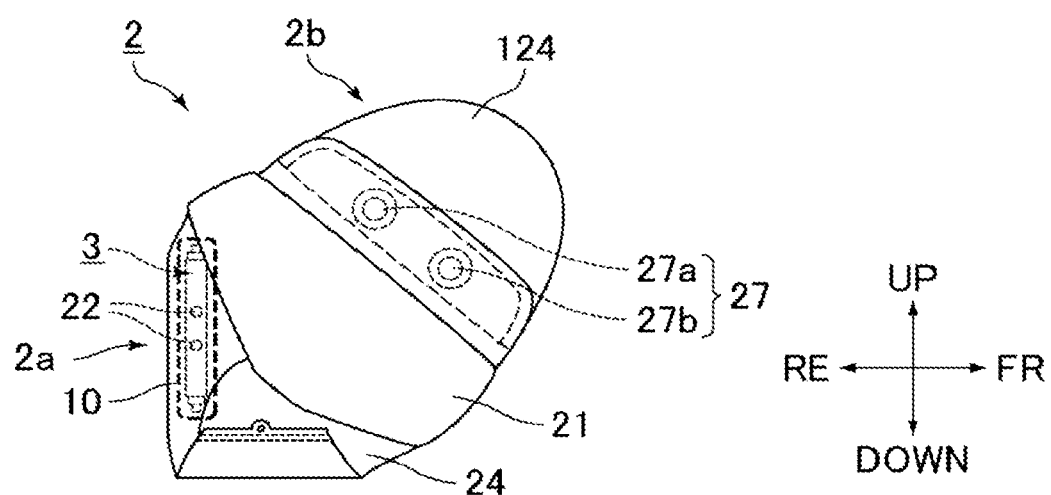
FIG. 22 is a third view for explaining the folding process of the airbag according to the second embodiment.

Before folding the airbag 2 in the vehicle front and rear direction, the lower of the first inflation part 2a may be folded upward in order to adjust the length in the vehicle upper and lower direction of the airbag device 1 in the folded state, as shown in FIG. 22.

Figure 23A:
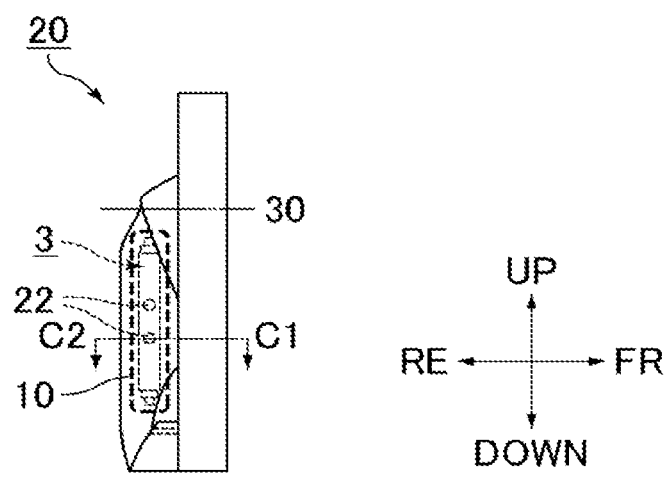
FIG. 23A is a fourth view for explaining the folding process of the airbag according to the second embodiment.
Figure 23B:
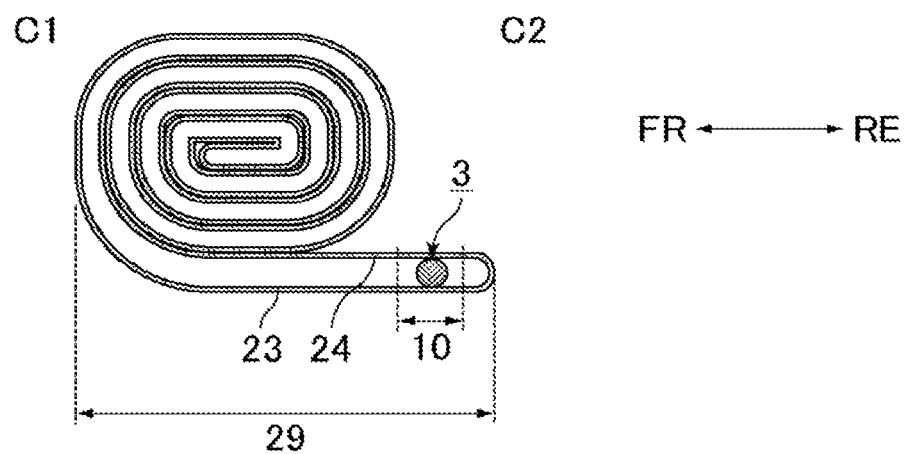
FIG. 23B is a sectional view taken along the line C1-C2 shown in FIG. 23A.

As shown in FIG. 23A, the main body part 20 and the inflated protruding part 21 are folded from the front (FR) toward the rear (RE) of the vehicle in a state of being overlapped with each other. FIG. 23B is a sectional view taken along the line C1-C2 shown in FIG. 23A. The folding method is not particularly limited. For example, as shown in FIG. 23B, the folding method may be a roll-folding method or a bellows-folding method.

Figure 24A:
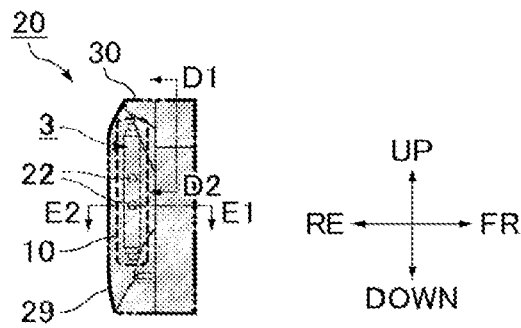
FIG. 24A is a fifth view for explaining the folding process of the airbag according to the second embodiment.
Figure 24B:
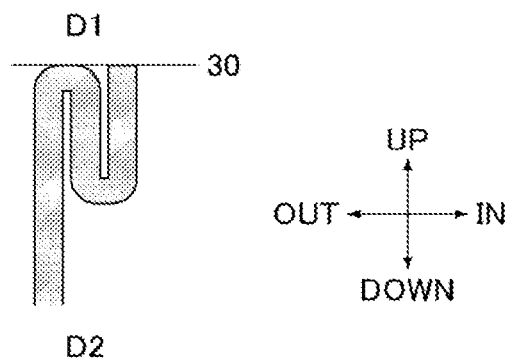
FIG. 24B is a sectional view taken along the line D1-D2 shown in FIG. 24A.
Figure 24C:
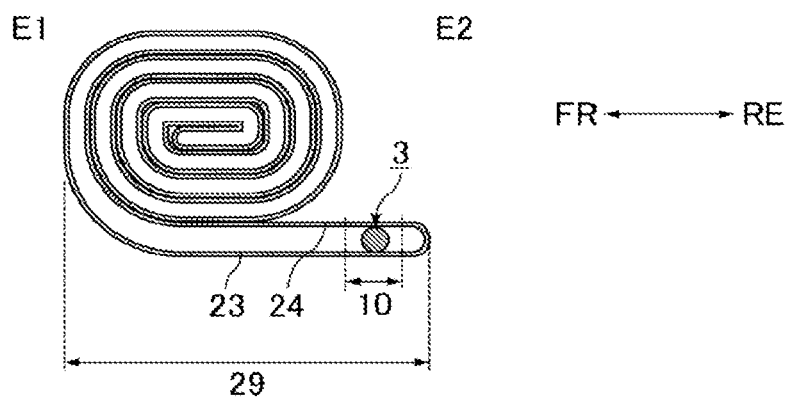
FIG. 24C is a sectional view taken along the line E1-E2 shown in FIG. 24A.

Subsequently, the airbag 2 is folded in the upper and lower direction. FIG. 24B is a sectional view taken along the line D1-D2 shown in FIG. 24A. FIG. 24C is a sectional view taken along the line E1-E2 shown in FIG. 24A. In FIGS. 24A and 24B, the second inflation part 2b, which is an upper portion of the airbag 2, is folded from the upper (UP) toward the lower (DOWN) of the vehicle, and then, is further folded from the lower (DOWN) toward the upper (UP) of the vehicle. The airbag 2 is attached to the side portion of the seat back 51 in the folded state shown in FIGS. 24A to 24C. The inflated protruding part 21 is folded to overlap the main body part 20. As shown in FIGS. 24A and 24C, in the mounted state of the side airbag device 1, the airbag 2 may be folded so that the inflated protruding part 21 is included in the roll-folded portion and the inflated protruding part 21 does not overlap the gas inflow part (the inflator mounting part 10), or the airbag 2 may be folded such that the inflated protruding part 21 overlaps the gas inflow part in a state where the inflated protruding part 21 is included in the roll-folded portion. Therefore, when gas is generated from the inflator 3, the first inflation part 2a is inflated and deployed prior to the inflated protruding part 21, and the airbag 2 is inflated and deployed while unfolded in the vehicle upper and lower direction. Therefore, the inflation and deployment speed of the main body part 20 in the vehicle upper and lower direction can be increased.

What is claimed is:

1. A side airbag device to be attached to a side portion of a seat back included in a vehicle seat, the side airbag device comprising:
    an inflator to be attached to the side portion of the seat back and configured to generate gas, the inflator having a gas ejection hole configured to allow the gas to flow out from the inflator; and
    a bag-shaped airbag configured to be inflated and deployed by the gas generated from the inflator, and being configured to be inflated and deployed beside an occupant seated on the vehicle seat and above a console box provided inward relative to the vehicle seat in a vehicle width direction, the airbag including:
        a first inflation part at which the gas ejection hole is disposed, the first inflation part being configured to be inflated and deployed beside a body of the occupant; and
        a second inflation part communicating with the first inflation part, the second inflation part being configured to be inflated and deployed beside a head of the occupant by the gas introduced from the first inflation part, wherein
    at least a portion of the first inflation part is configured to be inflated and deployed above the console box and to come into contact with an upper surface of the console box, and
    in a state where the airbag is folded, the second inflation part is folded to overlap the first inflation part such that the second inflation part is arranged inward of the first inflation part in the vehicle width direction.

2. The side airbag device according to claim 1, wherein in the state where the airbag is folded, the first inflation part and the second inflation part are further folded from a front toward a rear of the vehicle while being overlapped with each other.

3. The side airbag device according to claim 2, wherein the airbag has a first folded-back line in which the second inflation part is folded back toward a lower of the vehicle to overlap the first inflation part, and a second folded-back line in which the first inflation part and the second inflation part are folded back from the front toward the rear of the vehicle.

4. The side airbag device according to claim 3, wherein the first folded-back line is provided below a shoulder of the occupant in the state where the airbag is folded.

5. A side airbag device to be attached to a side portion of a seat back included in a vehicle seat, the side airbag device comprising:
    an inflator to be attached to the side portion of the seat back and configured to generate gas; and
    a bag-shaped airbag configured to be inflated and deployed by the gas generated from the inflator, and being configured to be inflated and deployed beside an occupant seated on the vehicle seat and above a console box provided inward relative to the vehicle seat in a vehicle width direction, the airbag including:
        a main body part configured to be inflated and deployed beside the seated occupant from the side portion of the seat back to protect the seated occupant;
        a gas inflow part provided in the main body part and configured to allow the gas to flow into the gas inflow part; and
        an inflated protruding part located inward of the gas inflow part in the vehicle width direction and configured to be inflated and deployed above the console box, wherein
    an area defining a shape of the airbag in a folded state and including the gas inflow part is defined as a non-folding area, and
    in a state where the airbag is partially unfolded to spread out into a flat surface, a folding line along which the inflated protruding part is folded to overlap the main body part does not overlap the non-folding area.

6. The side airbag device according to claim 5, wherein in the state where the airbag is partially unfolded to spread out into the flat surface, the inflated protruding part is folded toward a front of the vehicle.

7. The side airbag device according to claim 5, wherein in the state where the airbag is partially unfolded to spread out into the flat surface, the inflated protruding part is folded toward an upper of the vehicle.

8. The side airbag device according to claim 5, wherein in the folded state of the airbag, the airbag is further folded from a front to a rear of the vehicle to overlap the inflated protruding part and the main body part with each other.

* * * * *